(12) United States Patent
Salem et al.

(10) Patent No.: US 10,374,511 B2
(45) Date of Patent: Aug. 6, 2019

(54) SWITCHED CAPACITOR DC-TO-DC CONVERTER AND POWER CONVERSION CONTROL METHODS

(71) Applicant: The Regents of the University of California, Oakland, CA (US)

(72) Inventors: Loai Galal Bahgat Salem, La Jolla, CA (US); Patrick Mercier, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 7 days.

(21) Appl. No.: 15/545,614

(22) PCT Filed: Jan. 29, 2016

(86) PCT No.: PCT/US2016/015716
§ 371 (c)(1),
(2) Date: Jul. 21, 2017

(87) PCT Pub. No.: WO2016/123518
PCT Pub. Date: Aug. 4, 2016

(65) Prior Publication Data
US 2018/0019667 A1    Jan. 18, 2018

Related U.S. Application Data

(60) Provisional application No. 62/109,216, filed on Jan. 29, 2015, provisional application No. 62/116,650, (Continued)

(51) Int. Cl.
*H02M 3/07* (2006.01)

(52) U.S. Cl.
CPC .................................. *H02M 3/07* (2013.01)

(58) Field of Classification Search
CPC ........ H02M 3/07; H02M 3/156; H02M 3/157; H02M 3/158; H02M 3/18; H02M 2001/0012
See application file for complete search history.

(56) References Cited

U.S. PATENT DOCUMENTS

| 8,368,369 B2 | 5/2013 | Seeman et al. |
| 2006/0215428 A1 | 9/2006 | Mok et al. |
| (Continued) | | |

OTHER PUBLICATIONS

Bandyopadhyay, S., et al., "20μA to 100mA DC-DC Converter with 2.8 to 4.2V Battery Supply for Portable Applications in 45nm CMOS", IEEE Journal of Solid-State Circuits, vol. 46, No. 12, (Dec. 2011), pp. 2807-2820.

(Continued)

*Primary Examiner* — Gary L Laxton
(74) *Attorney, Agent, or Firm* — Greer, Burns & Crain, Ltd.; Steven P. Fallon

(57) ABSTRACT

A scalable controller circuit that provides faster and simpler regulation of a DC-to-DC converter is provided. Unlike such prior techniques, preferred embodiments do not require any threshold-level generation circuitry or analog compensation circuitry. Preferred embodiments implement a simple control law that requires only a few digital gates. Preferred embodiments can therefore significantly reduce the overhead power consumption and area of the controller in DC-to-DC converters to new levels.

8 Claims, 18 Drawing Sheets

Related U.S. Application Data filed on Feb. 16, 2015, provisional application No. 62/213,402, filed on Sep. 2, 2015.

(56) References Cited

U.S. PATENT DOCUMENTS

| | | | |
|---|---|---|---|
| 2006/0238261 A1* | 10/2006 | Rhee | H03L 7/0898 331/16 |
| 2008/0136532 A1* | 6/2008 | Hufford | H03L 7/081 331/10 |
| 2011/0101938 A1 | 5/2011 | Ma et al. | |
| 2012/0249101 A1 | 10/2012 | Akey | |
| 2013/0093407 A1 | 4/2013 | Heo et al. | |
| 2013/0099953 A1* | 4/2013 | Tsai | H03M 1/462 341/161 |
| 2013/0287231 A1* | 10/2013 | Kropfitsch | H02M 3/073 381/113 |
| 2013/0300477 A1* | 11/2013 | Ueda | H03L 7/099 327/159 |
| 2014/0043010 A1 | 2/2014 | Salem et al. | |
| 2014/0184189 A1 | 7/2014 | Salem et al. | |

OTHER PUBLICATIONS

Bang, S., et al., "A Fully Integrated Successive-Approximation Switched-Capacitor DC-DC Converter with 31mV Output Voltage Resolution", ISSCC Dig. Tech. Papers, (Feb. 2013), pp. 370-371.

El-Damak, D., et al., "A 93% Efficiency Reconfigurable Switched-Capacitor DC-DC Converter using On-Chip Ferroelectric Capacitors", ISSCC Dig. Tech. Papers, (Feb. 2013), pp. 374-375.

Kim, W., et al., "A fully-integrated 3-level DC/DC converter for nanosecond-scale DVS with fast shunt regulation", IEEE ISSCC, (Feb. 2011), pp. 268-270.

Le, H.-P., et al., "A Sub-ns Response Fully Integrated Battery-Connected Switched-Capacitor Voltage Regulator Delivering 0.19W/mm at 73% Efficiency", ISSCC Dig. Tech. Papers, (Feb. 2013), pp. 372-373.

Makowski, M.S., et al., "Performance limits of switched-capacitor DC-DC converters," Power Electronics Specialists Conference, (Jun. 1995), pp. 1215-1221.

Ramadass, Y., et al., Voltage Scalable Switched Capacitor DC-DC Converter for Ultra-Low-Power On-Chip Applications, IEEE Power Electronics Specialists Conference, (Jun. 2007), pp. 2353-2359.

Ramadass, Y., et al., "A 0.16mm$^2$ Completely On-Chip Switched-Capacitor DC-DC Converter Using Digital Capacitance Modulation for LDO Replacement in 45nm CMOS" ISSCC, (Feb. 2010), pp. 208-209.

Salem, L., et al., "A Recursive Switched-Capacitor DC-DC Converter Achieving $2^N-1$ Ratios With High Efficiency Over a Wide Output Voltage Range", IEEE J. of Solid-State Circuits, vol. 49, No. 12, (Dec. 2014), pp. 2773-2787.

R. Jain et al., "Conductance Modulation Techniques in Switched-Capacitor DC-DC Converter for Maximum-Efficiency Tracking and Ripple Mitigation in 22nm Tri-gate CMOS", CICC, Sep. 2014.

V. Ng et al., "A 92%-Efficiency Wide-Input-Voltage-Range Switched-Capacitor DC-DC Converter", ISSCC, Feb. 2012.

L.G. Salem and P.P. Mercier, "An 85%-Efficiency Fully-Integrated 15-Ratio Recursive Switched-Capacitor DC-DC Converter With 01-2.2V Output Voltage Range", ISSCC, Feb. 2014.

L.G. Salem and P.P. Mercier, "A 45-Ratio Recursively Sliced Series-Parallel Switched-Capacitor DC-DC Converter Achieving 86% Efficiency", CICC, Sep. 2014.

Texas Instruments, "TPS6050x High-Efficiency, 250-mA Step-Down Charge Pump", SLVS391C, Oct. 2001, Revised Sep. 2015.

* cited by examiner

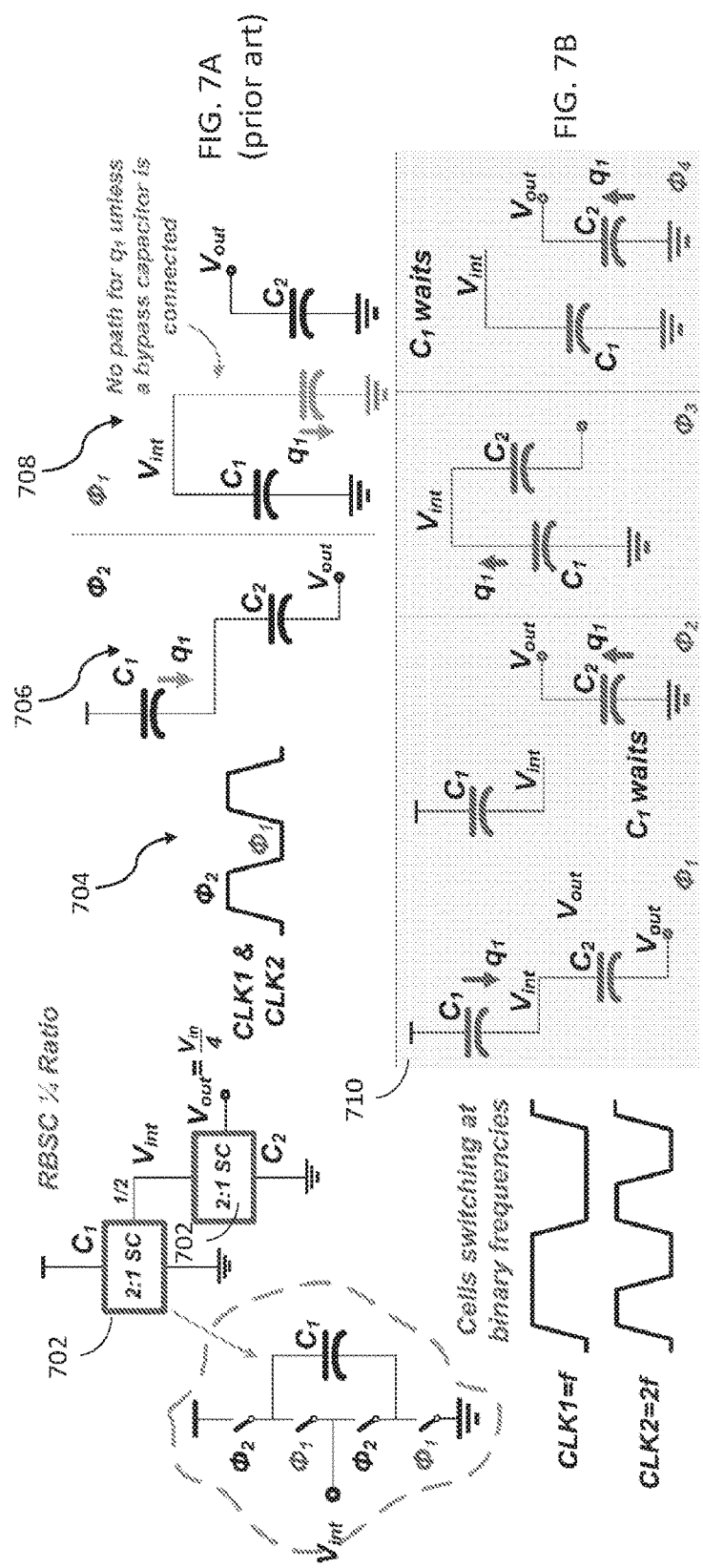

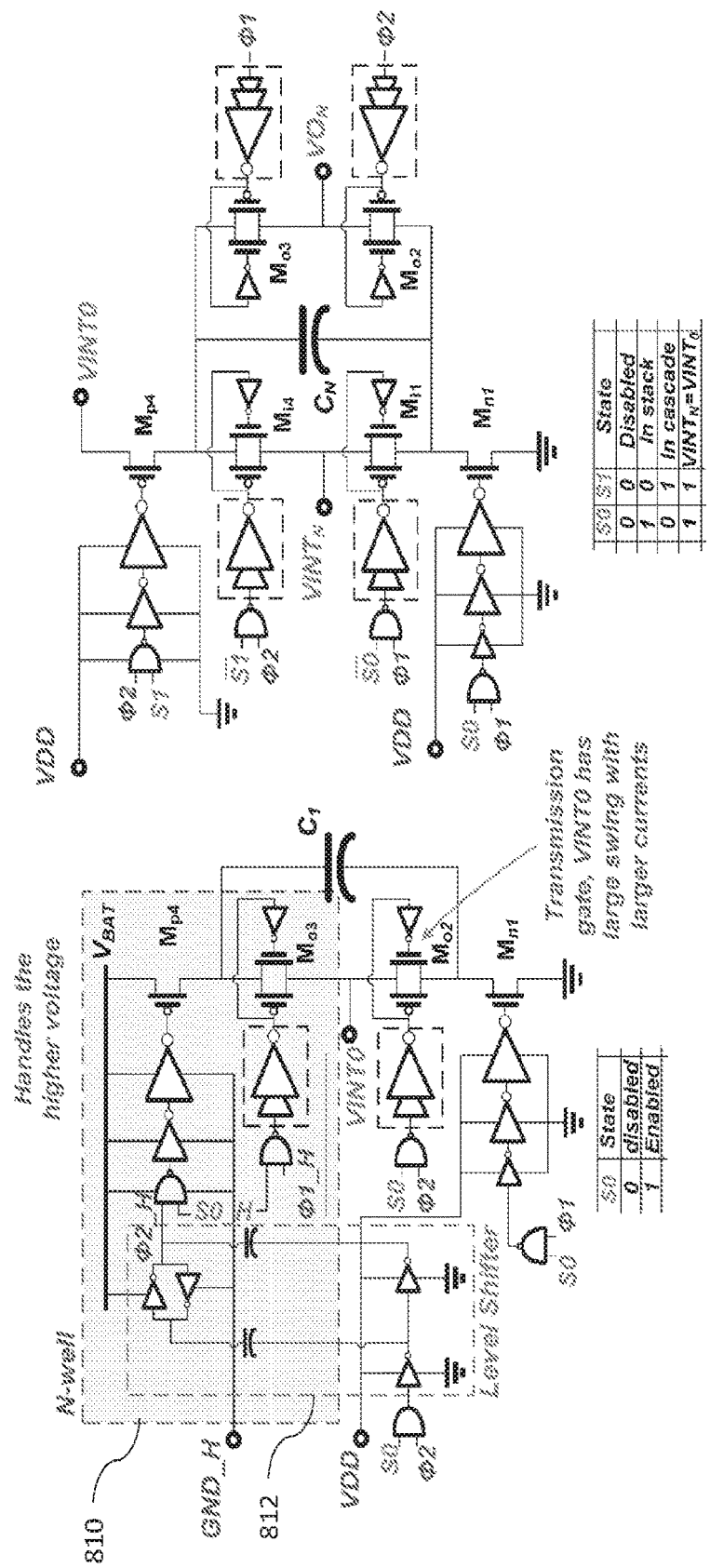
FIG. 8B Transfer Cell
FIG. 8A Boundary Cell

SWITCHED CAPACITOR DC-TO-DC CONVERTER AND POWER CONVERSION CONTROL METHODS

PRIORITY CLAIM AND REFERENCE TO RELATED APPLICATION

The application claims priority under 35 U.S.C. § 119 and from all applicable statutes and treaties from prior U.S. provisional application Ser. No. 62/109,216, which was filed Jan. 29, 2015, from prior U.S. provisional application Ser. No. 62/116,650, which was filed Feb. 16, 2015, and from prior U.S. provisional application Ser. No. 62/213,402, which was filed on Sep. 2, 2015.

FIELD

A field of the invention is DC-DC voltage conversion, particularly step-down conversion from a battery power source. Example applications of the invention include portable electronic devices, such as laptop computers, smart phones and tablets.

BACKGROUND

Portable electronic devices, such as laptops computers, smart phones and tablets, are powered by portable batteries when not connected to another power source. Typical battery voltages on mobile devices are much greater than the operating voltages for the various chip components. Typical batteries have voltage ratings in the range of 6-12 volts. Modern processors and electronics included in portable electronic devices operate at about 1 volt or less. DC-to-DC power converters are employed to reduce the battery voltage to useable levels for different components around the chip. The required step-down of voltage should also maximize battery life.

DC-DC conversion is primarily performed today using either linear regulators, switched-inductor, or switched-capacitor converters. Linear regulators are small, yet inefficient when voltage conversion ratios are large. Switched-inductor converters can be very efficient, but require large inductors that can limit the thinness of smartphones and other mobile platforms. Decreasing the size of the inductor would improve the form factor and cost of such devices.

The growing demand for both performance and battery life in portable consumer electronics requires converter and power management circuits to be small, efficient, and dynamically powerful. Dynamic voltage scaling (DVS) can help achieve these goals in load circuits, though generally at the expense of increased DC-DC converter size (through use of external inductors) or loss (through linear regulation). While switched-capacitor (SC) DC-DC converters can offer conversion in small, fully-integrated form-factors, their efficiencies are only high at specific discrete ratios between the input and output voltages. See, e.g., D. El-Damak et al., "A 93% Efficiency Reconfigurable Switched-Capacitor DC-DC Converter using On-Chip Ferroelectric Capacitors," *ISSCC Dig. Tech. Papers*, pp. 374-375, February 2013; H.-P. Le et al., "A Sub-ns Response Fully Integrated Battery-Connected Switched-Capacitor Voltage Regulator Delivering 0.19 W/mm² at 73% Efficiency," *ISSCC Dig. Tech. Papers*, pp. 372-373, February 2013; Y. K. Ramadass et al., "A 0.16 mm² Completely On-Chip Switched-Capacitor DC-DC Converter Using Digital Capacitance Modulation for LDO Replacement in 45 nm CMOS," *ISSCC Dig. Tech. Papers*, pp. 208-209, February 2010; Y. K. Ramadass et al., "Voltage Scalable Switched Capacitor DC-DC Converter for Ultra-Low-Power On-Chip Applications," *IEEE Power Electronics Specialists Conference*, pp. 2353-2359, June 2007; Y. K. Ramadass et al., "Voltage Scalable Switched Capacitor DC-DC Converter for Ultra-Low-Power On-Chip Applications," *IEEE Power Electronics Specialists Conference*, pp. 2353-2359, June 2007. More conversion ratios can increase the voltage output resolution. However, the additional ratios can escalate the number of components with employment of conventional topologies. As a result, many such converters only employ a small number of conversion ratios.

A successive approximation (SAR) SC topology has been proposed to address the dilemma of increased numbers of ratios causing unacceptable increases in complexity. See, S. Bang et al., "A Fully-Integrated Successive-Approximation Switched-Capacitor DC-DC Converter with 31 mV Output Voltage Resolution," *ISSCC Dig. Tech. Papers*, pp. 370-371, February 2013. This topology cascades several 2:1 SC stages to provide a large number of conversion ratios with minimal hardware overhead. However, the linear cascading of stages introduces cascaded losses, limiting overall efficiency. For example, the minimum $R_{out}$ is more than $30 \times R_{out}$ of a similar ratio Series-Parallel topology using the same silicon area. Additionally, current density is limited to that of a single stage, and capacitance utilization can be low for many of the conversion ratios.

Conventional commercial DC-DC Voltage Regulator IC's (VRICs) are a specific type of DC-DC switched inductor converter often employed for the DC-DC stepdown from battery voltage to portable device voltage levels. These converters tend to be bulky. These voltage regulator chips occupy a disproportionately large area, far more chip space than their simple role should warrant. The chips are also manufactured via a separate process from the remaining circuitry.

Because of the integration issue, the present state-of-the-art voltage regulation solution uses a separate on-board VRIC to power each component in the electronic system. A typical number of VRICs ranges from 20 in Notebooks to 7 ICs in devices like Bluetooth handsets. VRICs can occupy a significant percentage of the platform of a device, e.g. ~38% of the platform area in a popular ultra-small notebook computer.

Mobile electronic systems powered by Li-ion batteries typically employ a power management integrated circuit (PMIC) to stepdown the 2.8-4.2V battery voltage to a voltage more appropriate for load circuits (e.g., 0.5-1.8V). Most PMICs employ a switching inductor (SL) architecture, utilizing an off-chip inductor as a vehicle for energy conversion. While such designs can offer high efficiency over a wide range of voltages, they suffer from high cost and large area. In contrast, switched-capacitor (SC) DC/DC converters utilize capacitors that can have significantly higher power densities, 7× lower BOM cost, and 8× smaller footprint than typical power inductors. However, SC converters are only efficient at discrete ratios of input-to-output, and increasing the number of ratios with conventional topologies requires exponentially more capacitors and as a result a larger PCB footprint. Even recent work that achieves many ratios in modular topologies still requires large number of capacitors at large conversion ratios [L. Salem and P. P. Mercier, "An 85%-Efficiency Fully-Integrated 15-Ratio Recursive Switched-Capacitor DC-DC Converter With 0.1-2.2V Output Voltage Range," ISSCC, February 2014; L. Salem and P. P. Mercier, "A 45-Ratio Recursively Sliced Series-Parallel Switched-Capacitor DC-DC Converter Achieving 86% Efficiency," CICC, September 2014] and thus SL converters are currently the standard choice for PMIC designs.

Switched-capacitor (SC) converters can offer high efficiency and small size, yet have difficulty achieving these specifications at high power density, in part due to fundamental charge-sharing losses. Resonant SC converters (ReSC) have been proposed that combine inductors with capacitors to achieve high efficiency and power density, all in a small size. However, known ReSC converters typically require one inductor per flying capacitor to achieve resonant (or soft-charging) operation of all underlying capacitors. This limits the achievable number of DC-DC conversion ratios, thereby limiting the utility of ReSC converters in practical applications.

Seeman, U.S. Pat. No. 8,368,369 discloses a voltage regulator that provides hysteretic regulation of switched-capacitor converters. The regulator uses a set of cascaded flip-flops corresponding to phases of the converter. The set of cascaded flip-flops has a plurality of clock inputs coupled to the comparator output. The converters are phase interleaved converters with ratio configuration logic. The set of cascaded flip-flops have a plurality of clock inputs coupled to the comparator output, and a plurality of phase outputs trigger a phase transition in the converter if the output voltage signal falls below the reference voltage signal.

The commercial standard used for switched capacitors by major manufacturers is exemplified by the Texas Instruments TPS6050x step-down charge pumps. The gear logic uses a comparator and a resistor per selectable conversion ratio.

Recent Salem US Published Patent Application 2014/0043010 discloses an advance in DC-DC converters. The application discloses DC-DC converters that are capable of operating at one of a plurality of voltage conversion ratios. The converters include a plurality of switched cells that can be connected in a cascade, stack or a cascade and stack. Each cell can operation to provide a 2:1 transformation (voltage conversion level) to provide an output that is ½ the input to the cell. This new type of converter did not specify new control strategies to select the particular ratios. Recent Salem et al US Published Application 20140184189 discloses an inductively assisted switched capacitor DC-DC converter. The converter includes plurality of inductors that provide continuous modes from the plurality of distinct ratios obtained in a capacitive circuit.

SUMMARY OF THE INVENTION

Preferred embodiments provide an all-digital scalable controller circuit that provides faster and simpler regulation of a DC-to-DC converter compared with the prior art solutions. Unlike such prior techniques, preferred embodiments do not require any threshold-level generation circuitry or analog compensation circuitry. Preferred embodiments implement a simple control law that requires only a few digital gates. Preferred embodiments can therefore significantly reduce the overhead power consumption and area of the controller in DC-to-DC converters to new levels that are not possible with the conventional commercial VRIC solutions discussed in the background. Preferred embodiments can provide new levels of battery power management with an accurate and arbitrarily high voltage-resolution controller while penalizing the lowest complexity ever realized to the knowledge of the inventors.

A preferred DC-DC converter includes a plurality of capacitive converter cells that provide a plurality of conversion ratios. An all-digital binary search controller dynamically switches through a plurality of modes using an outer coarse grain controller search at a clock rate of the converter. Fine grain control logic searches at a multiple of the clock rate of the converter and sets a final conversion ratio using an output of the converter as a voltage reference. Preferably, the multiple of the clock rate is generated by an oscillator that is on-chip with the all-digital binary search controller. The converter can be used, for example, in a laptop computer, tablet or smart phone.

A preferred method of performing voltage regulation of a DC-DC conversion from an input voltage to a desired output voltage by selectively configuring a plurality of converter cells using a controller having a comparator and a sequential logic includes: obtaining a target voltage ratio based on the input voltage and the desired output voltage with coarse control that selects a configuration of the plurality of converter cells, and refining the target voltage ratio within a predefined plurality converter conversion ratios by comparing voltage output to the desired output voltage at a higher rate of comparison than the coarse control and selecting a refined configuration of the plurality of converter cells.

A preferred embodiment is a frequency scaled gear train switching voltage regulator and charge feedback integrated circuit, included cascaded capacitive cells configured such that flying capacitance of a given stage does not commence gathering new charge until the flying capacitor of a next stage retrieves a present stored charge of the given stage.

A preferred embodiment is a frequency scaled gear train switching voltage regulator and charge feedback integrated circuit having two independent SC converters that can be operated separately with one disabled, in parallel, or independently together.

A preferred embodiment is recursive resonant switched capacitor DC to DC converter that includes a plurality of capacitive switching stages, wherein each stage lacks a inductor and a final stage is coupled to an output inductor. A switching controller switches stages prior to the final stage at a progressively divided frequency from the resonant frequency. Capacitance and conductance of the plurality of capacitive switching stages are allocated to minimize resonant frequency changes.

BRIEF DESCRIPTION OF THE DRAWINGS

FIG. 7A (prior art) illustrates a conventional binary SC converter that provides ¼ conversion ratio;

FIG. 7B illustrates a preferred embodiment scaled gear train switching converter of the invention;

FIGS. 8A and 8B respectively illustrate preferred circuits for boundary and transfer cells of the 2:1 building block cells of the FIG. 7B converter;

DETAILED DESCRIPTION OF THE PREFERRED EMBODIMENTS

Figure 1:
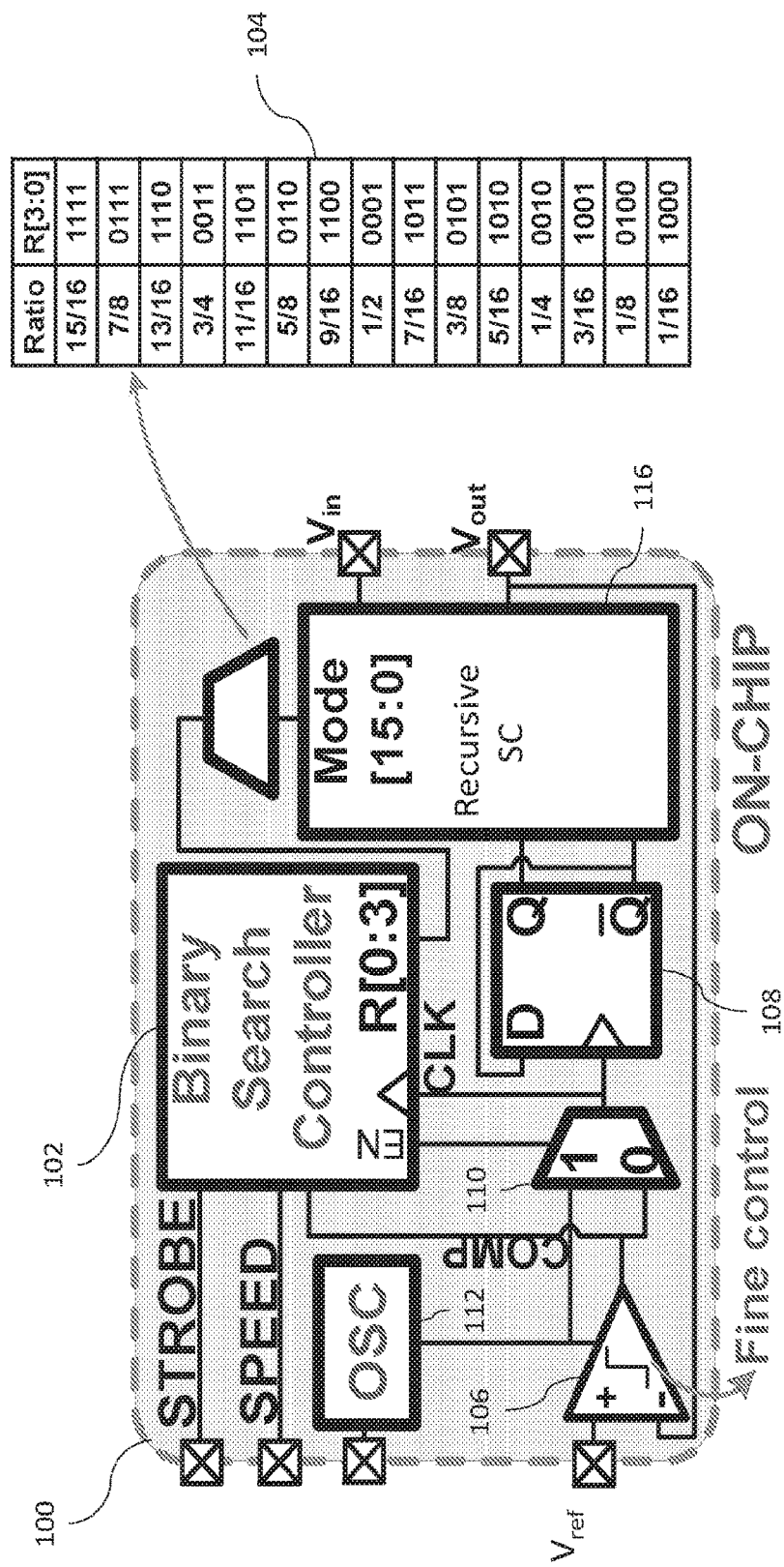
FIG. 1 is a high-level diagram of a preferred embodiment all digital controller for a DC-DC converter and an exemplary mode code table.

Preferred embodiments provide an all-digital scalable controller circuit that provides faster and simpler regulation of a DC-to-DC converter compared with the state-of-the-art prior art solutions. Unlike such prior techniques, preferred embodiments do not require any threshold-level generation circuitry or analog compensation circuitry. Preferred embodiments implement a simple control law that requires only a few digital gates. Preferred embodiments can therefore significantly reduce the overhead power consumption and area of the controller in DC-to-DC converters to new levels that are not possible with the conventional commercial VRIC solutions discussed in the background. Preferred embodiments can provide new levels of battery power management with an accurate and arbitrarily high voltage-resolution controller while penalizing the lowest complexity ever realized to the knowledge of the inventors. There is no need for preferred converters to generate an independent reference voltage, instead the converters use the converter output as a reference.

Preferred embodiments further include software products that can be configured, synthesized, transmitted and installed in a digital signal processor to create a DC-DC controller. Embodiments provide a synthesizable and scalable control module that can be directly delivered, e.g. through a hardware description language program, e.g., Verilog code, as a soft-IP or as a software product to run on a digital signal processor (DSP). Such soft-IP can cater and be optimized to specific portable device needs and also permit updating.

Preferred embodiments leverage digital processing to apply power management methods that significantly lowers the power consumption in microchips. Preferred embodiments provide the fastest control law known to the inventors, providing voltage regulation in sub-nanosecond range to enable fine-grain load power tracking. Such power tracking and regulation can allow a portable device to significantly increase operating time on battery power compared to state-of-the-art techniques.

A particular preferred embodiment provides a Recursive Switched Capacitor (RSC) DC-DC converter topology that achieves high efficiency across a wide output voltage range by providing $2^N-1$ conversion ratios using N 2:1 SC cells with minimal hardware overhead. High efficiency is achieved in the preferred embodiment by 1) selectively connecting individual 2:1 SC converters either in series or parallel, where the number of connections to Vin and ground is maximized in order to minimize the total charge transferred through the flying capacitors thereby minimizing cascaded losses; 2) utilizing 100% of the flying capacitance in charge transfer across all $2^N-1$ conversion ratios; and 3) ensuring optimal relative sizing between flying capacitor sizes and constituent switches such that 2:1 SC stages with the highest current are dynamically allocated the majority of the capacitance and switch resources. Control to select the ratios uses the output of the converter as a reference and does not require the generation of an independent reference voltage. A fine control operates at a multiple of the frequency of a coarse control and conducts a comparison based upon the output of the converter.

An additional preferred embodiment is a frequency scaled PMIC that is a field-programmable 1-to-2 channel SC PMIC that achieves n-bit resolution with only n capacitors (e.g., 5 bit resolution with 5 capacitors) and that provides high efficiency across a wide voltage range. A frequency scaled gear train circuit topology provides binary scaling of cascaded stages' switching frequency. The preferred topology eliminates otherwise mandatory inter-cell charge-balance capacitors. This provides a 2× reduction in the required number discrete capacitors compared to conventional solutions. This also provides backward cell-disabling for resolution reconfiguration, minimizing the resistance in the current path and isolating the challenges of ESR and ESL SC PMIC packaging to only a single output-side capacitor. Since the SC PMIC can be implemented as a 2-dimensional 2:1 SC cell array and switch fabric, the PMIC can be programmed to support either 1 or 2 independent DC-DC converter channels for applications that require independent supplies in one compact chip with an adjustable number of discrete capacitors depending on the user's needs.

A particular preferred embodiment is a recursive resonant switched capacitor DC to DC converter. The preferred embodiment includes a frequency-scaled gear-train topology, and only requires a single inductor for an arbitrarily large number of ratios. The topology is free from constraints of prior devices discussed in the background, and combines the advantages of both switched inductor and switch capacitor converters. In preferred embodiments, a multi-stage converter is provided. The final stage is switched at the resonant frequency, while prior stages are switched at progressively divided frequencies. The division is by a gear ratio, which is a real number greater than 1.

A particular preferred topology includes reconfiguration switches that allow a plurality of SC ratios with adiabatic charging via a single inductor while using 100% of on-chip capacitance. The preferred topology brings initial cells in parallel to latter ones when using lower than full resolution ratios. This can achieve, for example, 50% duty cycle clocks with less than about a 1.2% efficiency penalty.

An additional preferred converter includes embodiments with one or a plurality of capacitors, e.g., two or three, that are connected in series with an output inductor. This allows the resonant frequency to change from a given state to a next state. Preferred embodiments minimize resonant frequency changes by allocating weighted C (capacitance) and G (conductance) to maintain fixed current densities.

A preferred DC-DC converter includes a plurality of capacitive converter cells that provide a plurality of conversion ratios. An all-digital binary search controller dynamically switches through a plurality of modes using an outer coarse grain controller search at a clock rate of the converter.

Fine grain control logic searches at a multiple of the clock rate of the converter and sets a final conversion ratio using an output of the converter as a voltage reference. Preferably, the multiple of the clock rate is generated by an oscillator that is on-chip with the all-digital binary search controller. The converter can be used, for example, in a laptop computer, tablet or smart phone.

A recursive ratio decoder can respond to the binary search controller and set switches in the plurality of converter cells to a conversion ratio set by the binary search controller.

The plurality of converter cells in preferred embodiment are realized with 2:1 switching capacitive converters arranged as boundary cells and transfer cells.

The fine grain control preferably includes a comparator that compares a present stage power output to desired voltage level and the recursive ratio decoder configures into a larger binary ratio if the comparator determines that the present power stage has a lower than desired voltage and configures into a next lower resolution if the comparator determines that the power stage exceeds the desired voltage.

The all-digital binary search controller and the fine grain control logic preferably set switches to obtain a sequential circuit including an interconnected arrangement the plurality of capacitive converter cells to execute a control law.

A preferred method of performing voltage regulation of a DC-DC conversion from an input voltage to a desired output voltage by selectively configuring a plurality of converter cells using a controller having a comparator and a sequential logic includes: obtaining a target voltage ratio based on the input voltage and the desired output voltage with coarse control that selects a configuration of the plurality of converter cells, and refining the target voltage ratio within a predefined plurality converter conversion ratios by comparing voltage output to the desired output voltage at a higher rate of comparison than the coarse control and selecting a refined configuration of the plurality of converter cells.

A preferred embodiment is a frequency scaled gear train switching voltage regulator and charge feedback integrated circuit, included cascaded capacitive cells configured such that flying capacitance of a given stage does not commence gathering new charge until the flying capacitor of a next stage retrieves a present stored charge of the given stage.

Preferably the capacitive cells have no bypass capacitors and the next stage operates at at least twice the frequency of the given stage.

Preferably, each of said capacitive cells includes four switches and one capacitor, and does not require any extra bypass capacitor or out of phasing implementation. Preferably, each cell is operated from two non-overlapping clock phases. Preferably, each of said capacitive cells includes two out-of-phase 2:1 SC converters.

Preferably, capacitive cells have no bypass capacitors and a next capacitive cell operates at a frequency larger than the frequency of a previous capacitive cell.

Preferably, capacitive cells have no bypass capacitors and a next capacitive cell operates at a frequency smaller than the frequency of a previous capacitive cell.

Preferably, a switching voltage regulator shared among two or more of the cascaded capacitive cells.

The cascaded capacitive cells can be configurable to provide step down conversion or to provide step up conversion.

A preferred embodiment is a frequency scaled gear train switching voltage regulator and charge feedback integrated circuit having two independent SC converters that can be operated separately with one disabled, in parallel, or independently together.

A preferred embodiment is recursive resonant switched capacitor DC to DC converter that includes a plurality of capacitive switching stages, wherein each stage lacks a inductor and a final stage is coupled to an output inductor. A switching controller switches stages prior to the final stage at a progressively divided frequency from the resonant frequency. Capacitance and conductance of the plurality of capacitive switching stages are allocated to minimize resonant frequency changes.

Preferred embodiments of the invention will now be discussed with respect to the example embodiments below and in the attachment following the example claims. The drawings may include schematic representations, which will be understood by artisans in view of the general knowledge in the art and the description that follows.

Preferred embodiments employ a basic switchable converter cell as disclosed in Salem US Published Patent Application 2014/0043010. Individual cells that can be cascaded, stacked or a cascaded and stacked are selected by preferred embodiment converter controllers. In example embodiments, each cell can operation to provide a 2:1 transformation (voltage conversion level) to provide an output that is ½ the input to the cell. Additional ratios other than a 2:1 transformation are also disclosed. The control, as mentioned above, is conventional and relies upon the generation of an independent reference voltage.

FIG. 1 illustrates a preferred embodiment converter controller 100 that can select such 2:1 cells (or other ratios that either step-down or step up) to achieve a variety of conversion ratios. The converter controller includes an all-digital binary search controller 102 that dynamically switches through a plurality of modes. In a preferred embodiment, the controller selects between 15 modes, represented in an example mode control table 104. After a mode is selected by the binary controller/coarse control 102, a comparator/fine control 106 fine tunes the output $V_{out}$ through $R_{out}$ frequency control. $R_{out}$ is the equivalent output resistance of the switched capacitor converter, or the resonant converter equivalent output resistance. The coarse controller 102 uses the SC power stage itself to produce the different comparison levels (voltage comparison levels produced from the SC converter when operated at max frequency), which simplifies the implementation and provides an accurate control that minimizes $R_{out}$ and provides robustness against process variation. Specifically, $V_{out}$ is used. This is accomplished by switching the SC converter at the highest frequency so that $R_{out}$ is of the lowest value. Then the SC output at such condition is compared to $V_{ref}$. Once STROBE is activated (through an event that initiates the binary search operation), EN is set at the binary search controller 102 and the SC converter 116 switches at the highest frequency where $R_{out}$ is minimum for a given mode (SC conversion ratio). In an example embodiment, the coarse controller takes 3 decision cycles if the target mode is $n_{odd}/16$. A fourth correction cycle may result when the desired mode is $n_{even}/16$, where the back-off logic defines the amount of shift-left to the latest ($V_{mode} > V_{ref}$) (Vref and Vmode are not shown in FIG. 1) occurrence. $V_{ref}$ is the user/device required output voltage, while $V_{mode}$ is the unloaded conversion ratio of the switched capacitor converter. Vref can change as a result, for example of a direct software/hardware request due to a change in workload or many other scenarios appreciated by artisans. The illustrated mode-code 104 simplifies the controller implementation where the code registers the consecutive comparison decisions.

Inner Fine Grain Controller (Comparator 106)

A T flip-flop 108 (D flip flop with a feedback from Q bar to the D input) employed in FIG. 1 guarantees a 50% duty-cycle input clock to the non-overlap phase generator. A Strong-Arm comparator 106 running at $f_{comp}$ is used to provide the clock input to the T flip-flop 108. There is no need for an independent voltage reference to be generated, the comparator 106 compares $V_{ref}$ to the output of the converter $V_{out}$. The comparator sampling clock is produced by an on-chip current-starved oscillator 112 that is set to at least twice the maximum switching frequency of the power converter stage; since the power stage switching frequency across all the 15 ratios does not exceed 8 MHz, the current starved oscillator is set to 16 MHz through an external bias, $V_B$. The oscillator 112 can also be set to higher multiples of the switching frequency, e.g., 4 times the switching frequency.

Outer Coarse-Grain Controller

Coarse-grain control in reconfigurable Switched-Capacitor (SC) DC-to-DC converters typically switches between discrete ratios by using a resistor string to generate ratio threshold levels. However, a large number of ratios requires a prohibitively large resistor string, that takes into account the $R_{out}$ variation across the different ratios in order to avoid control deadlock. In the FIG. 1 embodiment, the power stage itself is used to produce the threshold levels. By operating the binary search controller 102 at the maximum switching frequency $f_{sw}$ and scanning through the available ratios using binary search, the optimal ratio (i.e., the ratio that provides the required output level $V_{ref}$ with minimum resistive voltage drop) can be located. A 4-bit shift register (this is the R[0:3] part in the 102 binary search controller), that is supplied to a recursive switched capacitor (SC) converter 116, is used to hold the present ratio state of the SC power stage. Once STROBE is asserted, RST is triggered and the power stage is reconfigured into the 1/2 DC-to-DC ratio. Then, EN (enable) is asserted on the binary search controller 102, initiating the binary search procedure. As a result, the CLK signal is routed directly from the on-chip oscillator 112 through the multiplexer shown in FIG. 1, switching the power stage at 8 MHz (generally the maximum operating frequency of a particular converter) to provide the minimal output resistance, $R_{out}$. During the binary search operation of the coarse binary controller 102, the switched capacitor (SC) power stage 116 is reconfigured among various ratios. When the SC converter is switched to a new conversion ratio to a new ratio it takes $R_{out}C_{out}$ time delay (where the $R_{out}$ is the equivalent output resistance of the SC converter, originating from the switches on resistances and the employed capacitors, and $C_{out}$ is the output decoupling capacitance of the SC converter). Therefore, once the SC power stage is reconfigured into a new ratio, the controller has to wait for certain time until the power stage reaches the steady state value for the controller to perform the right comparison. Speed is an external signal set by the user to define the preferred time for the power stage to wait until the output reaches steady state. Strobe is an external signal provided once the reference voltage $V_{ref}$ is changed by a user or as a result of a device requirement. In this particular implementation, the SPEED signal goes to a counter and selects either to wait 32 cycles or 64 cycles before the controller steps to the next conversion ratio during the binary search operation.

Figure 2:
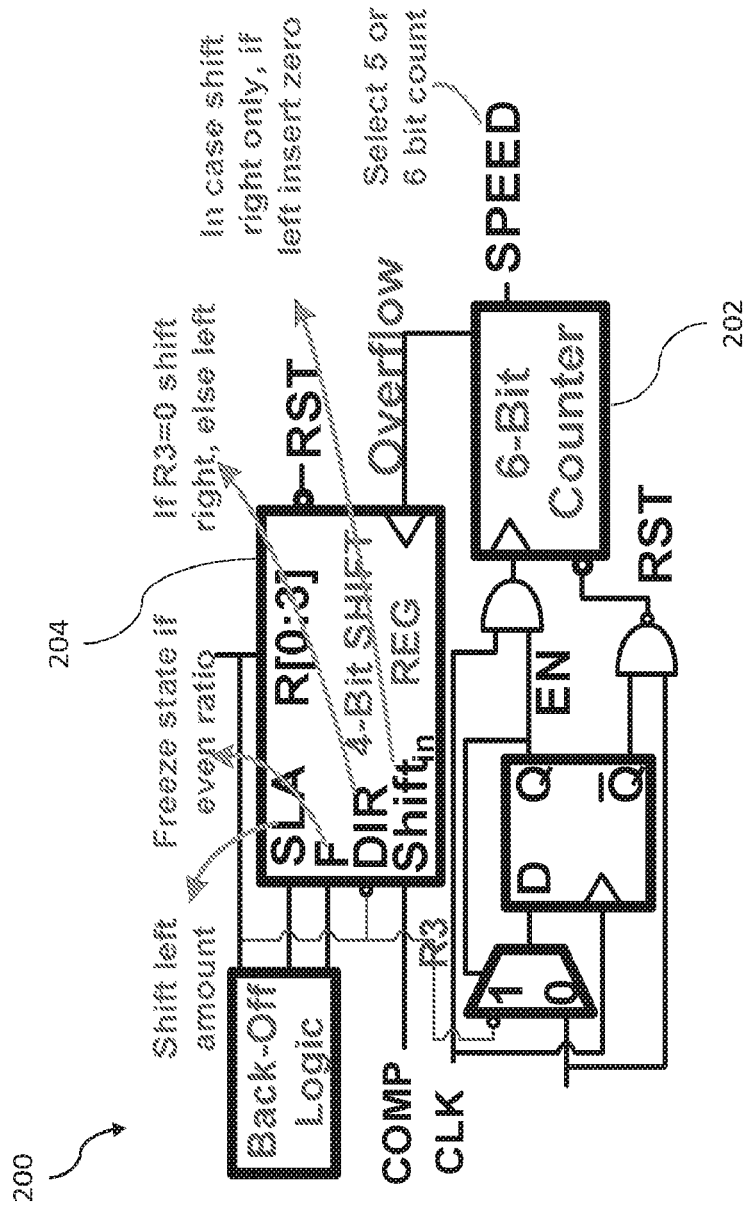
FIG. 2 is a high-level diagram of a preferred embodiment ratio decoder for the FIG. 1 controller for a DC-DC converter.

FIG. 2 illustrates a preferred recursive binary search controller 200. The ratio-state code 104 shown in FIG. 1 registers consecutive comparison decisions and enables a recursive implementation of the binary search controller 104. Once a counter 202 overflows (OVR is asserted), a 4-bit shift-register 204 stores a present fine-grain controller comparison decision with Vref. The counter 202 in this example is a 6 bit counter. This sets the delay time required to reach steady state. In this particular example implementation, 6-bits are used since 10 nF output decoupling capacitor is used. However, if a smaller output decoupling is used, a smaller number of bits can be employed and vice versa. The shift register 204 is 4-bits to accommodate 15 ratios. Additional bits accommodate additional ratios. If the output of the comparator 106, COMP, is zero, the present power stage output is lower than the desired level, Vref, and the SC is reconfigured into a larger binary-ratio at the next resolution configuration, (1+Ri-1)/2, once the comparison decision 0 is registered at the OVR edge. On the other hand, when COMP is 1, the 4-bit register 204 shifts in 1 and the power stage is reconfigured to the lower next-resolution binary-ratio (Ri-1)/2, where (i-1) is the previous search iteration.

Experimental versions of the invention consistent with FIGS. 1 and 2 have been fabricated. The details of the experimental versions of FIGS. 1 and 2 provide additional details about preferred embodiments above and will now be discussed.

Figure 3:
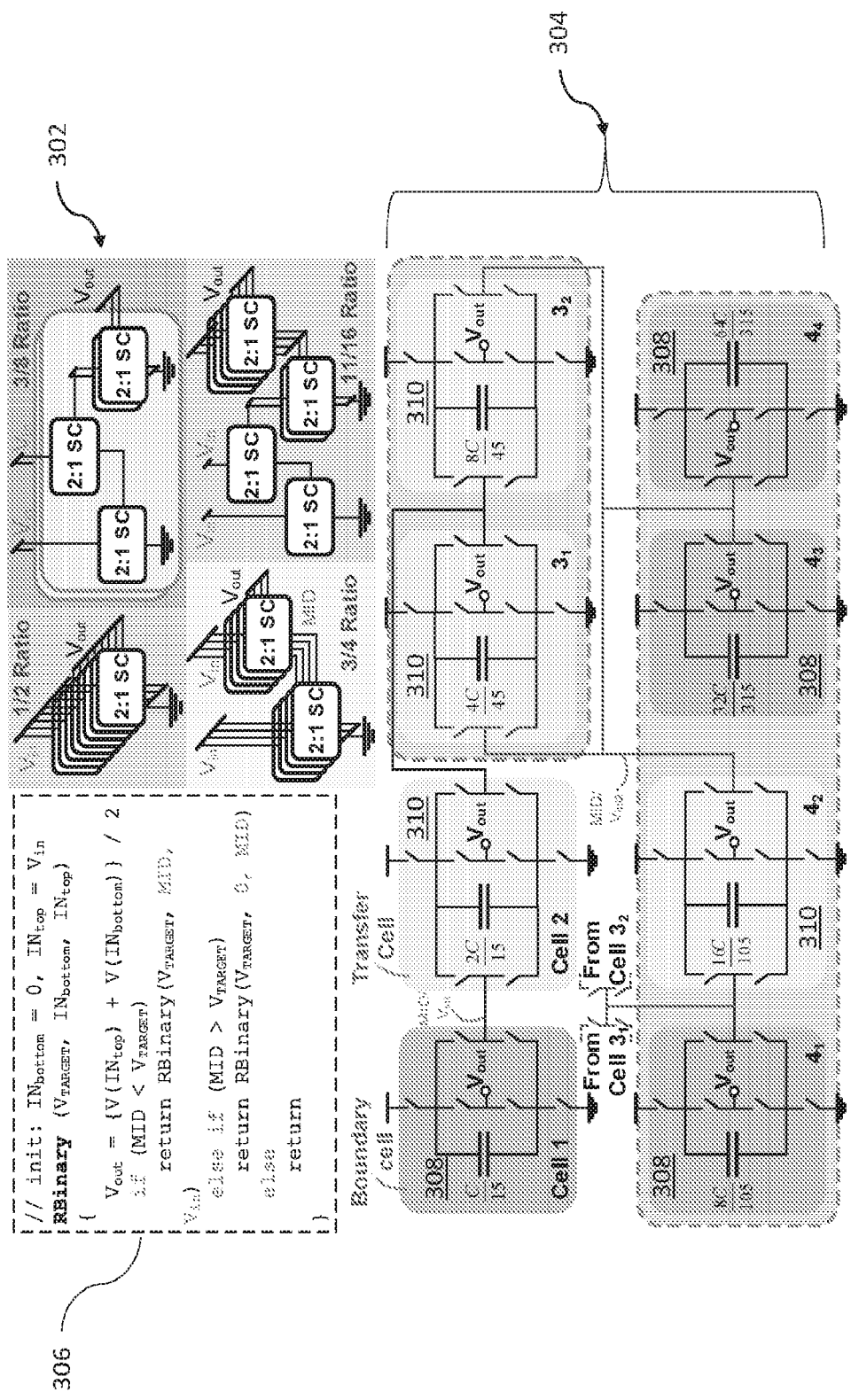
FIG. 3 illustrates a preferred circuit topology for the converter cells and pseudo code.

A preferred Recursive topology for the binary switched capacitor converter 116 is illustrated in FIG. 3 and is consistent with Salem US Published Patent Application 2014/0043010. FIG. 3 illustrates simplified examples 302 of how to realize 1/2, 3/4, 3/8, and 11/16 conversion ratios along with an 8 cell block 304 (304 is consistent with FIG. 9 of US Published Patent Application 2014/0043010) showing a circuit block that can achieve 15 ratios. Each iteration through a RSC pseudo-code generator 306 (implementing FIG. 10 of US Published Patent Application 2014/0043010) instantiates a new 2:1 SC cell, where the output of each cell, MID, produces the average of its input port $IN_{top}$ voltage and "ground" port $IN_{bottom}$. The first instantiated 2:1 SC cell is connected between $V_{in}$ and circuit ground. The $IN_{top}$ ports of all subsequent 2:1 cells are either connected to $V_{in}$ or another stage's MID port, while the $IN_{bottom}$ ports are either connected to circuit ground or another stage's MID port. Through these connections, the amount of charge through the flying capacitors is minimized, maximizing the capacitance utilization factor and minimizing cascaded losses. The number of iterations (i.e., recursion depth N) defines the resolution and output voltage $V_{out}=V_{in}/2^N$, where $V_{out}$ is obtained through the MID port of the final conversion stage.

The example 8-cell block 304 illustrates the experimentally implemented recursive SC that can achieve 15 ratios. Although four 2:1 SC converters are only technically necessary to realize 15 ratios, eight cells are preferred to permit optimization of relative capacitor and switches sizes, ensuring the latter stages that handle increased current have larger capacitors and switches, increasing efficiency by >5%. Two types of cells are used in the preferred converter: boundary cells 308 that have port $V_{int}$ for connection to the MID port of the prior stage; and transfer cells 310 that have an extra port $V_{int2}$ for connections from non-adjacent cells. All modes are opportunistically configured for a maximum number of $V_{in}$ and 0 connections. For example, in the 1/2 ratio, all 8 cells are connected in parallel to $V_{out}$ for maximum efficiency. In $n_{odd}/4$ ratios (i.e., 1/4 and 3/4), cells 1, 2 are connected in cascade as well as the cells $3_1$, $3_2$; $4_1$, $4_2$; and $4_3$, $4_4$, while in total four 2-cell cascades are connected in parallel. In $n_{odd}/8$ ratios, cells 1-3 are connected in cascade while cell 4 is configured as a paralleled configuration to cells 1-3. Finally, in $n_{odd}/16$ modes, cells 1-4 are connected in cascade (though sub-cells within cells 3 and 4 are connected in parallel).

Figure 4:
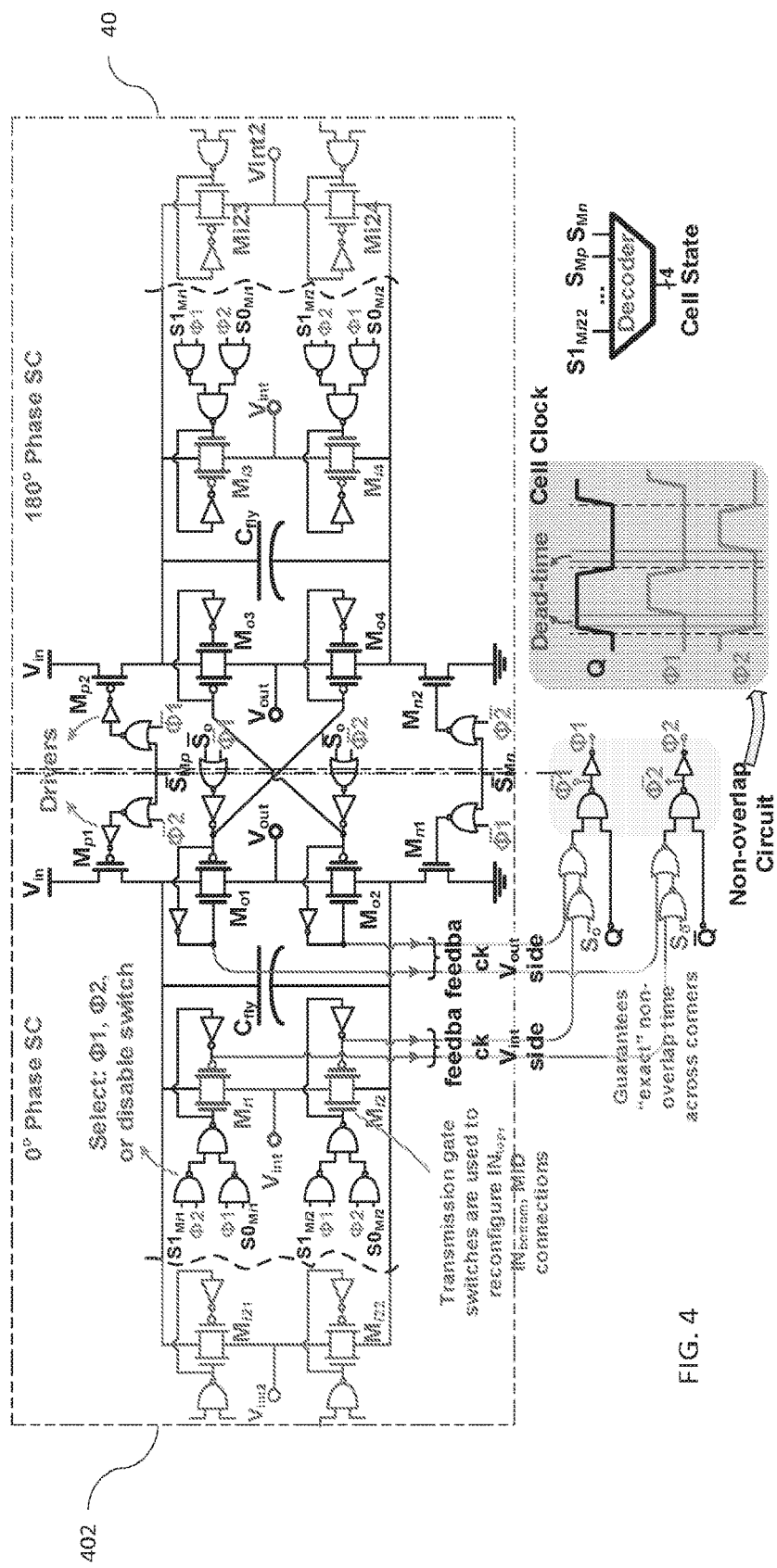
FIG. 4 is a circuit diagram of a preferred 2:1 SC converter cell.

FIG. 4 illustrates the implementation of the boundary and transfer cells in the experimental device, which provides for 2:1 converter cells. Each cell uses two out-of-phase 2:1 SC converters 402, 404 to provide charge balance between stages. Transmission gates $M_{i1}$-$M_{i4}$ and $M_{o1}$-$M_{o4}$ are used for MID switches to maintain constant on-resistance among various ratios. Two non-overlap phases Φ1, Φ2 are used to drive the switches. To realize the various states of the boundary and transfer cells, digital selection logic (NAND gates with Φ1, Φ2 and S1mi1 and SoMi0) is used to semi-permanently enable/disable a switch, or select the Φ1, Φ2 signals for a transmission gate. There is therefore no need for extra series reconfiguration switches. A decoder is used to provide the selection signals.

Figures 5A, 5B:
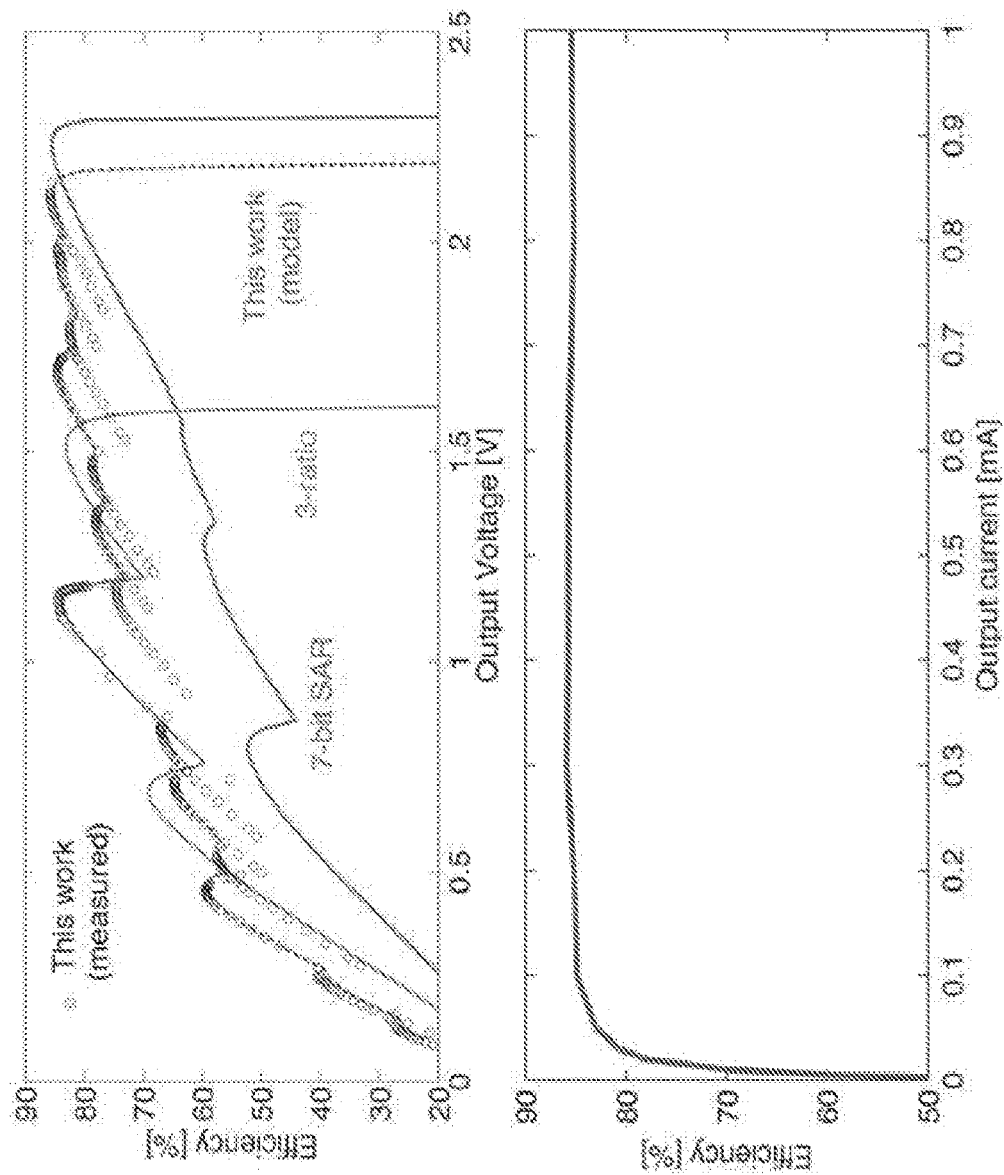
FIGS. 5A and 5B illustrate the efficiency of an experimental converter versus output voltage and current.
Figure 6A:
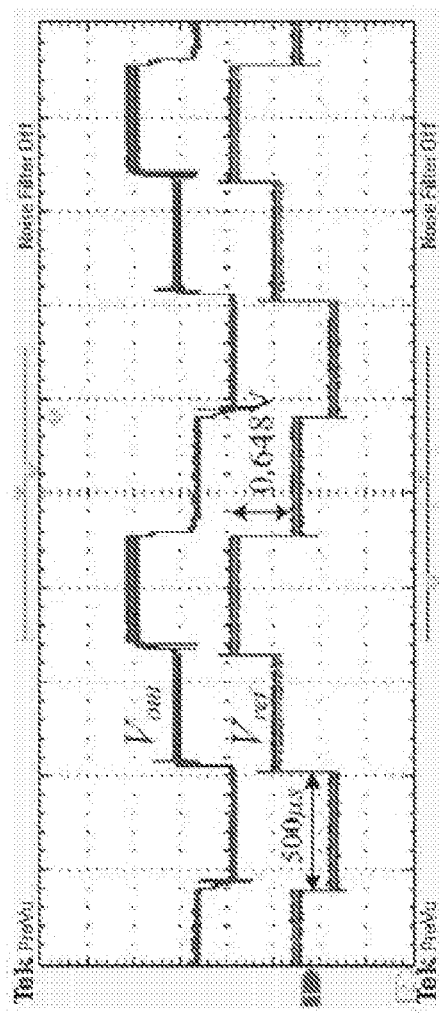
FIGS. 6A and 6B respectively illustrate a variable step control voltage input and the transient response of the experimental converter.
Figure 6B:
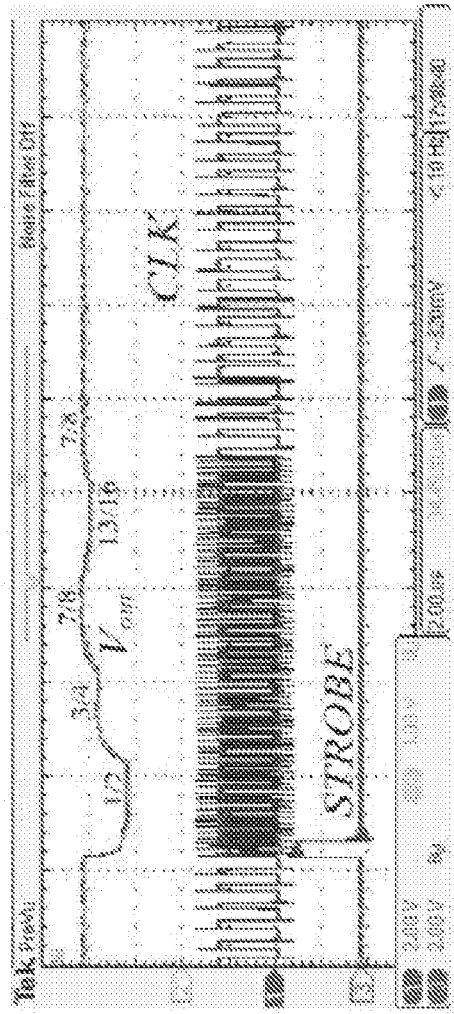

The recursive switched capacitor converter was fully integrated in a 0.25 μm bulk CMOS with MIM capacitor densities of 0.9 fF/μm² and a maximum input voltage of 2.5V. Measurement results in FIGS. 5A and 5B show the efficiency of the converter versus output voltage (at 2 mA) and current (at 1.15V), illustrating important advantages of the preferred architecture: greater than 70% efficiency is achieved over an output range from 0.9-2.2V at a 2 mA load current, while achieving greater than 80% efficiency for currents ranging from 30 μA-1 mA. The converter achieves a peak efficiency of 85%. Generally, larger capacitors provide higher efficiency than smaller ones. Measured results match those from a theoretical model within 1%. The RSC topology achieves 4.5% and 28% efficiency improvements over similarly-modeled 3-ratio Series-Parallel and SAR topologies for the same silicon area in 0.25 μm CMOS, respectively, while achieving an output operating range that is 38% larger than the 3-ratio topology. FIGS. 6A and 6B respectively show a variable step control voltage input and the transient response of the converter, illustrating the 8 μs response time of the controller. The control voltage $V_{ref}$ is changed every 500 μsec with variable step sizes of 650 mV maximum value.

FIG. 6B also details the transient coarse controller response when the STROBE signal is activated while the SC is initially producing a 2V output voltage. Here, the SC power stage phase clock, clk, is switched at the maximum frequency while the coarse controller cycles through the various binary ratios until the output reaches the desired level after 8 sec. In the third cycle of this example, the coarse controller reaches the 13/16 ratio, which cannot produce the desired level $V_{ref}$=2V, given the converter Rout. Thus, a fourth correction cycle automatically results and the Back-Off logic returns the power stage to the correct 7/8 ratio. Finally, the coarse controller hands off the regulation operation to the fine level frequency controller where clk goes back to a normal frequency. Artisans will appreciate the advantage offered with only one comparator being required to implement both the outer coarse-grain control and the inner fine-grain control.

Table 1 compares the experimental device to prior converters.

| Design | [1] | [2] | [5] | This Work |
|---|---|---|---|---|
| Technology | 130 nm CMOS | 65 nm CMOS | 180 nm CMOS | 0.25 um CMOS |
| Cap Type | Ferroelectric | Bulk PMOS | On-Chip | MIM |
| Chip Area (mm²) | 0.366 | 0.64 | 1.69 | 4.645 |
| Total Capacitance | 8 nF | 3.88 nF | 2.24 nF | 3 nF |
| Topology | 1, 2/3, 1/2, 1/3 Series-Parallel | 1/3, 2/5 Series-Parallel | 7-bit SAR | 4-bit Recursive |
| $V_{in}$ | 1.5 V | 3-4 V | 3.4-4.3 V | 2.5 V |
| $V_{out}$ | 0.4-1.1 V | 1 V | 0.9-1.5 V | 0.1-2.18 V |
| Quoted Efficiency (η) | 93% | 74% | 72% | 85% |
| Load Current @ η | 1 mA | 32 mA | 10 μA | 2 mA |

The fabricated chip utilized 4.645 mm² of area for 3 nF of on-chip capacitance. The prior devices referenced are: [1] D. El-Damak et al., "A 93% Efficiency Reconfigurable Switched-Capacitor DC-DC Converter using On-Chip Ferroelectric Capacitors," ISSCC Dig. Tech. Papers, pp. 374-375, February 2013; [2] H.-P. Le et al., "A Sub-ns Response Fully Integrated Battery-Connected Switched-Capacitor Voltage Regulator Delivering 0.19 W/mm2 at 73% Efficiency," ISSCC Dig. Tech. Papers, pp. 372-373, February 2013. [3] Y. K. Ramadass et al., "A 0.16 mm2 Completely On-Chip Switched-Capacitor DC-DC Converter Using Digital Capacitance Modulation for LDO Replacement in 45 nm CMOS," ISSCC Dig. Tech. Papers, pp. 208-209, February 2010; [5] V. Ng et al., "A 92%-Efficiency Wide-Input-Voltage-Range Switched-Capacitor DC-DC Converter," ISSCC Dig. Tech. Papers, pp. 282-283, February 2012.

Scaled Gear Train Switching Regulation

In conventional SC topologies, e.g. Ladder and Doubler topologies, a bypass capacitor is required between the constituent capacitors to provide charge balance and thereby enable a valid steady state output. A conventional binary SC converter that provides 1/4 conversion ratio is shown FIG. 7A. When switching two cascaded cells 702 and 703 with a converter clock 704, the two cells' capacitors, C1 and C2, are stacked in Φ2 as represented in 706 and a charge of q1 is delivered to Vout. However, in Φ1 as represented in 708, C1 will not be able to satisfy charge balance conditions (i.e. charge conservation) at steady state without a bypass capacitor in between the two cells. Another viable solution would be to have another 2:1 SC converter cell in parallel to the second cell, C2, operating out of phase. Unfortunately, in both solutions three capacitors are required. Efficiency can also be increased with the present gear train embodiment. The gear-train topology requires fewer capacitors than other converters, so for a given available PCB area/volume, we can use fewer, though larger capacitors, thereby achieving higher efficiency per unit area or volume.

FIG. 7B illustrates a circuit topology 710 of a preferred embodiment. The circuit 710 switches the last cell 703, C2, at twice the frequency of the first cell 702, C1. This avoids any need for a bypass or out-of-phase capacitor. In the present topology 710, each pair of cascaded cells is operated in sequence and a bypass capacitor is eliminated. The flying capacitance of a stage, e.g. C1, does not commence gathering new charge, i.e. switched to the next clock phase, until the flying capacitor of the next stage, e.g. C2, retrieves the present stored charge. There is a separate clock for each cascaded stage, thus two clocks for 2 stages, three clocks for three stages, etc. By eliminating conventional overhead DC bypass capacitors that do not contribute to the charge shuttling, the present topology reduces the incurred charge sharing loss for the same capacitance, e.g. 2.7× in the FIG.

7B example. For a conventional binary topology with K capacitors, the 2× reduction in the number of required capacitors from the present topology exceeds the Kth Fibonacci number, and thus exceeds the highest conversion ratio topology known to the inventors from past work [M. S. Makowski et al., "Performance limits of switched-capacitor DC-DC converters," Power Electronics Specialists Conference, June 1995]. As a result of the 2× reduction in the number of capacitors, the present topology narrows the gap between SL and SC designs, thereby enabling a competitive SC PMIC in comparable footprint.

FIGS. 8A and 8B respectively illustrate preferred circuits for boundary and transfer cells of the 2:1 building block cells 710 implemented in a preferred embodiment. A boundary cell in FIG. 8A transfers charge from the input battery, VBAT, while a transfer cell in FIG. 8B shuttles the charge from a previous stage to either the next one, or to the output, depending on the required ratio. Each cell includes four switches $M_{n1}$, $M_{o2}$, $M_{o3}$, and $M_{p4}$ and one capacitor $C_N$, and does not require any extra bypass capacitor or out of phasing implementation. Each cell is operated from two non-overlapping clock phases, Φ1 and Φ2 as discussed with respect to FIG. 7B, to eliminate any short circuit current. Transmission gates Mo2, Mo3, Mi1, Mi4 are used for the output side in the boundary cell and in the input side switches in the transfer cell. The example embodiment boundary cell of FIG. 8A is capable of handling voltages up to 5V while utilizing 2.5V thin-oxide devices. To accomplish this, the boundary cell upper power switches, $M_{o3}$ and $M_{p4}$, are preferably implemented in a separate deep N-well 810. Capacitive level shifters 812 are used in the boundary cell to shift the driving clock phases, Φ1 and Φ2, from (0, VDD) to the upper voltage island (GND_H, VBAT). To realize the various states in the boundary and transfer cells, enable logic blocks NAND gates are implemented to gate the power switch driving phase.

Figure 9:
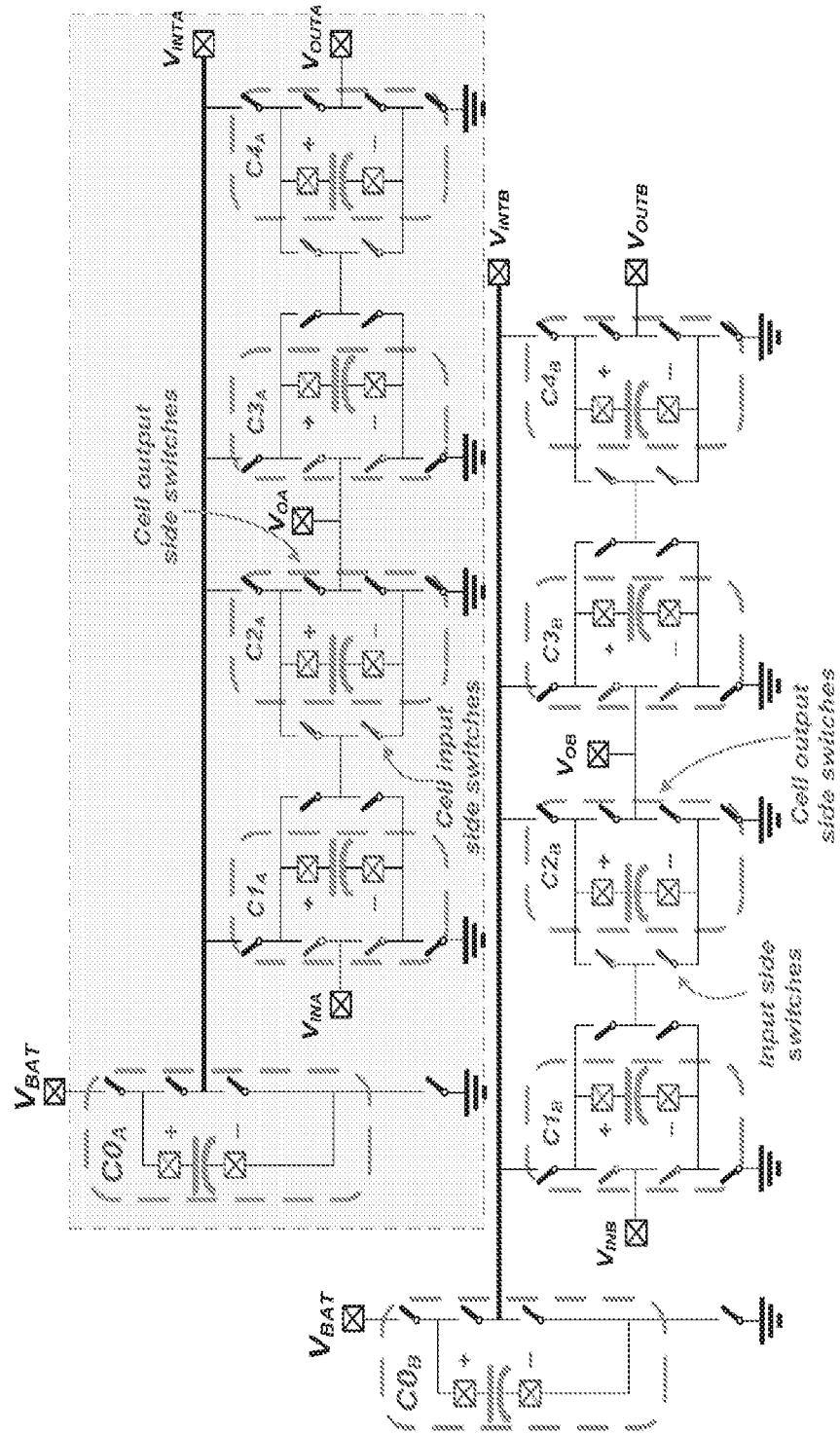
FIG. 9 is a switch-level block diagram of an implemented experimental embodiment SC PMIC in accordance with FIGS. 7B and 8.

FIG. 9 is a switch-level block diagram of an implemented experimental embodiment SC PMIC in accordance with FIGS. 7B and 8. As in a recursive binary (RB) topology, the implemented SC enables a cascade of 5 stages C0-C4 to realize a resolution of up to 5-bits. The preferred converter includes two independent SC converters, $C0_A$-$C4_A$ and $C0_A$-$C4_A$, with capability to disable one of them, operate them in parallel, or operate them independently. In the first A stage, each converter uses a boundary cell to handle the high battery voltages while enabling output voltages in the lower half of the battery range. An on-chip cascaded chain of D-flip flops is used to generate the various binary scaled clock phases for each stage, and by enabling all subsequent four cells in each converter, A and B, the various modd/32 ratios can be realized. Instead of disabling the last cell in a cascade when realizing lower resolutions, backward cell-disabling can be provided such that the initial cells in the cascade are the ones disabled. For instance, to realize modd/16 ratios, cells C1A or C1B are disabled in converter A or B, respectively, while their driving clocks are bypassed without division to the previous cells, i.e. C0A and C0B. A similar approach is followed for the lower 3- and 2-bit resolution ratios. Through backward disabling, the last cells $C4_A$ and $C4_B$ become the critical cells that switch at the maximum frequency and handle the largest currents, while the remaining cells switch at binary divided clocks, localizing the packaging ESL and ESR challenges to the single capacitor of the final stages. As in an FPGA, the 2-dimensional 5 rows×2 columns 2:1 SC array provides a field programmable PMIC. For example, by connecting 1 to 4 ceramic capacitors to the corresponding transfer cells chip pads of converter A or B, 2-bit to 5-bit resolutions can be attained. Additionally, by shorting the corresponding cells' capacitor terminals in A and B converters, the conductance can be programmed.

A preferred frequency scaled gear train topology of the invention achieves, for K capacitors, 2(K−1)/Fk higher DC-to-DC voltage conversion resolution, where Fk is the kth Fibonacci number. As a result, the embodiment attains 2(K−1)/Fk reduction in the required number of capacitors and an equivalent reduction in volume-cost as well as footprint. In comparison to the state-of-the-art VRIC selected in 2014 by the IEEE ISSCC Technical committee (L. G. Salem and P. P. Mercier, "A Recursive Switched-Capacitor DC-DC Converter Achieving 2N−1 Ratios With High Efficiency Over a Wide Output Voltage Range," IEEE J. of Solid-State Circuits, vol. 49, no. 12, pp. 2773-2787, December 2014). The preferred embodiment achieves 2 times reduction in the number of discrete capacitors for the same performance and therefore 2 times lower volume-cost and 2 times lower footprint.

Figure 10A:
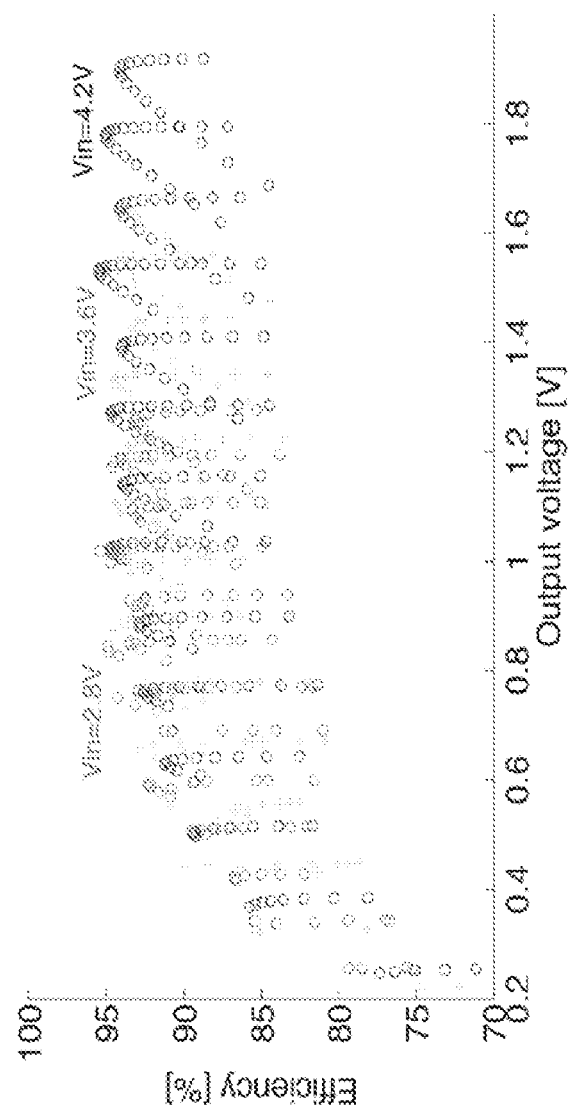
FIGS. 10A and 10B respectively plot the efficiency at various input voltages for a DVS modeling load of 118Ω and 20Ω for the FIG. 9 converter.
Figure 10B:
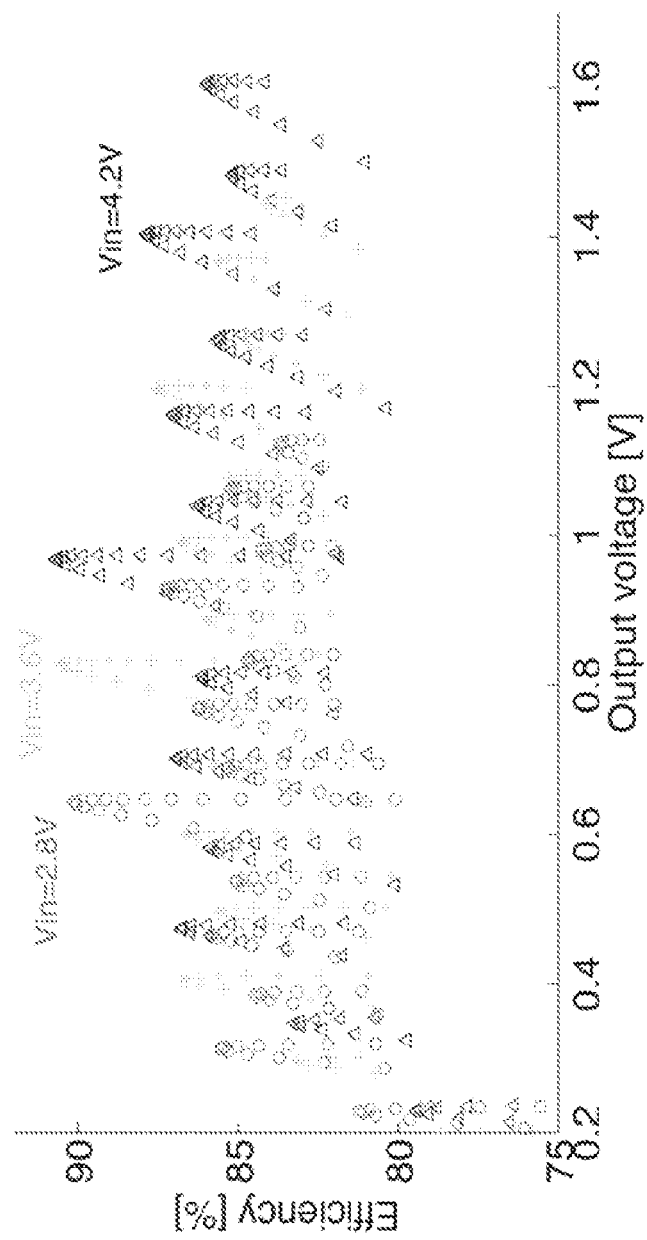
Figure 11:
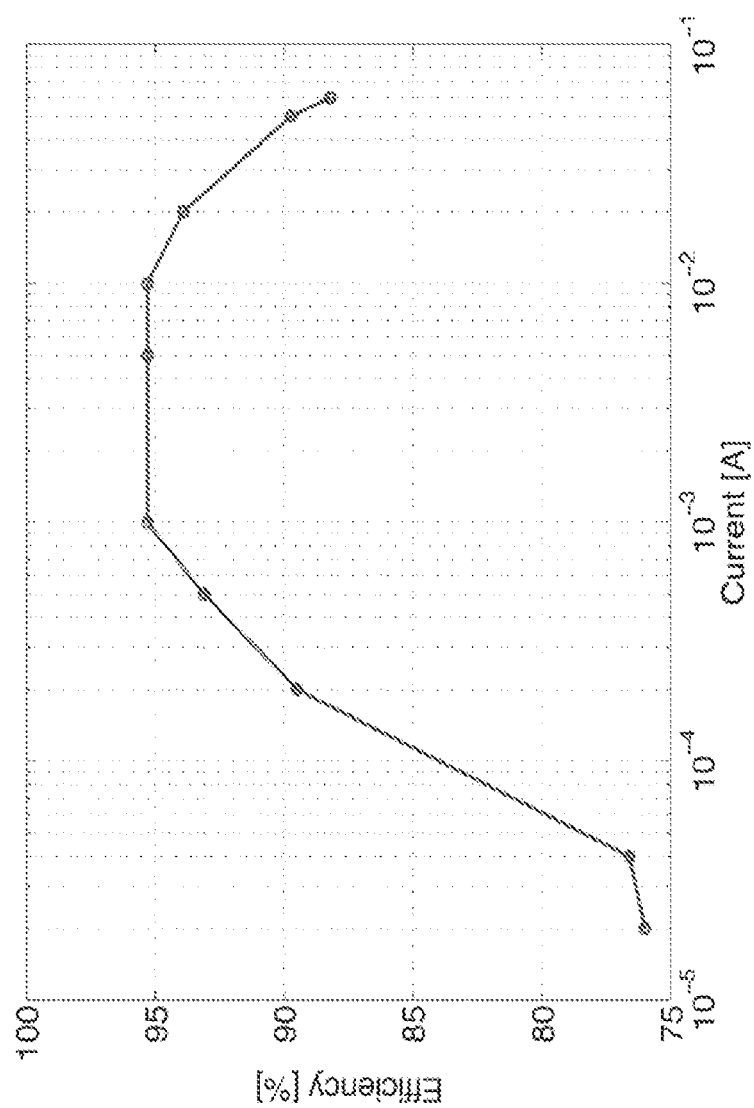
FIG. 11 plots the efficiency when a single converter (converter A) of FIG. 9 is operated at a constant load current, FIG. 12A (prior art) shows a conventional 3-bit converter, with inductors required for each of three stages C1-C3.

An experimental embodiment was fabricated in a 0.25 μm bulk CMOS process. Through the stacked voltage domains of the first stage, the chip can operate beyond the Li-ion battery range, achieving a total input range of 2.5-5V. At the same time, due to the 15 available ratios, a wide output range of 0.2-2.0V is achievable. In this implementation, a single channel of the converter uses one 9.4 μF capacitor for the first stage, and 4.4 μF capacitors for the remaining stages. FIGS. 10A and 10B respectively plot the efficiency at various input voltages for a DVSmodeling load of 118Ω and 20Ω, corresponding to 9.3 mA and 55 mA nominal load at 1.1V output voltage, respectively. The efficiency at 20Ω peaks at ~91%, and is above 85% and 80% efficiency across the output voltage range at 118Ω and 20Ω, respectively. FIG. 11 plots the efficiency when a single converter (converter A) is operated at a constant load current, achieving a peak efficiency of 95.3% and greater than 80% efficiency down to 60 μA. Table 2 show a comparison of the experimental embodiment to prior SC converters.

TABLE 2

| | Comparison to Prior SC Converters | | | |
| --- | --- | --- | --- | --- |
| | ISSCC'11 | ISSCC'12 | ISSCC'13 | This Work |
| Technology | 45 nm | 0.18 μm | 65 nm | 0.25 μm |
| Input voltage | 2.8-4.2 V | 7.5-13.5 V | 3-4 V | 2.5-5 |
| Output voltage | 0.4-1.2 V | 1.5 | 1 | 0.2-2 V |
| Chip area | 2.25 mm$^2$ | 11.6 mm$^2$ | 0.64 mm$^2$ | 25 mm$^2$ |
| Passives | 10 μH inductor | 8 × 10 μF | 4 integrated capacitors | 1 × 9.4 μF, 4 × 4.4 μF |
| Voltage resolution | High | 7 ratios | 2 ratios | 15 ratios at 32-bit |

TABLE 2-continued

Comparison to Prior SC Converters

|  | ISSCC'11 | ISSCC'12 | ISSCC'13 | This Work |
|---|---|---|---|---|
| Number of independent channels | 1 | 1 | 1 | 2 |
| Topology | Buck | Dickson | Series parallel 2/5, 1/3 | Frequency Scaled |
| Peak Efficiency | 87.4% | 92% | 74.3% | 95.3% |
| Load Current @ ηpeak | 50 mA | 220 mA | 122 mA | 20 mA |

[ISCC'11] S. Bandyopadhyay et al., "20 µA to 100 mA DC-DC Converter with 2.8 to 4.2 V Battery Supply for Portable Applications in 45 nm CMOS," ISSCC, February 2011.
[ISCC'12] V. Ng et al., "A 92%-Efficiency Wide-Input-Voltage-Range Switched-Capacitor DC-DC Converter," ISSCC, February 2012.
[ISCC'13] H. P Le et al., "A Sub-ns Response Fully Integrated Battery Connected Switched-Capacitor Voltage Regulator Delivering 0.19 W/mm² at 73% Efficiency," ISCC, February 2013.

Reconfigurable Single Inductor Soft-Charged Switched-Capacitor DC-DC Converter.

A preferred embodiment circuit converts the DC voltage of portable device battery to a microchip supply voltage level, e.g. from 3.6V battery to 1.1V. The preferred embodiment, compared to all prior-art Voltage Regulator Integrated Circuits in the past 30 years known to the inventors, performs DC-to-DC voltage conversion with minimum energy loss in the smallest size, i.e. xy footprint+Z-thickness, reported in all previously published work/patents, and the embodiment achieves unprecedented volumetric power density with minimum BOM cost. Indeed, through mathematical graph theory that is verified through lab-measured results of a manufactured prototype, the embodiment attains the smallest number of energy-storage components as compared with prior-art well-known benchmark circuits.

A prototype of a preferred embodiment has been tested to provide DC-to-DC conversion from an input battery of voltages between 5-to-2.5 Volts with a measured high-efficiency reaching 95.3%. Such voltage range exceeds the Li-ion battery range used in 99% of today's cell phones, tablets, laptops and etc. This confirms the successful operation of the embodiment and therefore the lowest number of capacitors VRIC ever built. Preferred embodiments further include software products that can be configured, synthesized, transmitted and installed in a digital signal processor to create a DC-DC controller. Embodiments provide a synthesizable and scalable control module that can be directly delivered, e.g. through Verilog code as a soft-IP or as a software product to run on a digital signal processor (DSP). Such soft-IP can cater and be optimized to specific portable device needs and also permit updating.

Preferred embodiments leverage digital processing to apply power management methods that significantly lowers the power consumption in microchips. Preferred embodiments provide the fastest control law known to the inventors, providing voltage regulation in sub-nanosecond range to enable fine-grain load power tracking. Such power tracking and regulation can allow a portable device to significantly increase operating time on battery power compared to state-of-the-art techniques.

Figure 12A:
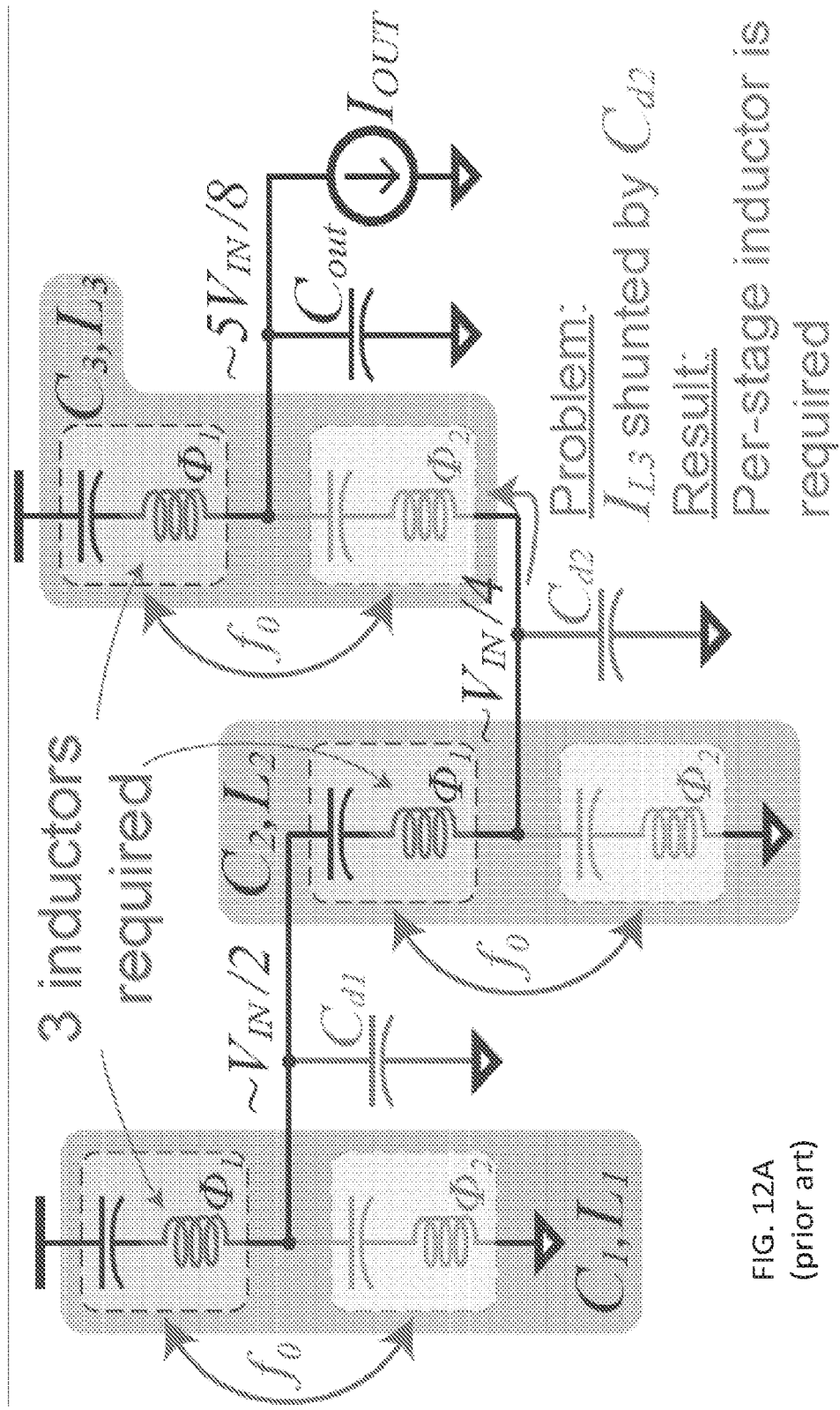
FIG. 12B illustrates a preferred embodiment frequency scaled soft charge converter of the invention.
Figure 12B:
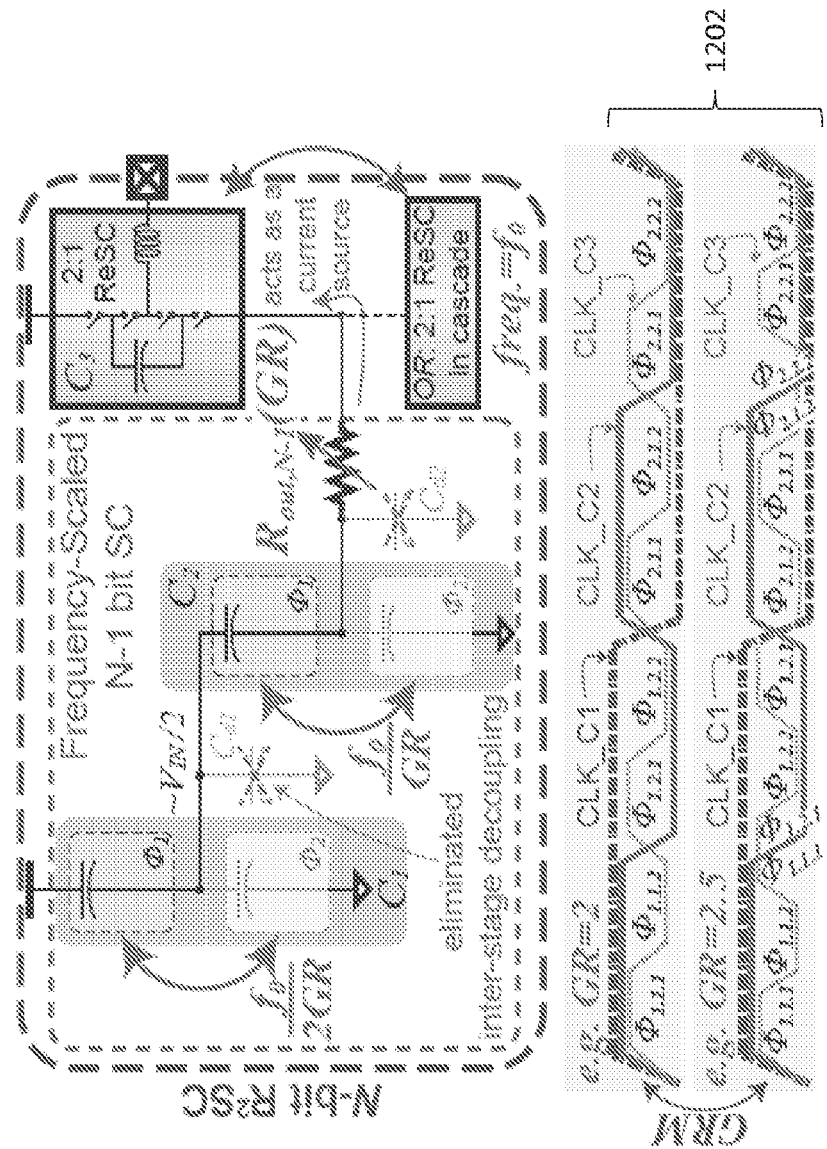
Figure 13:
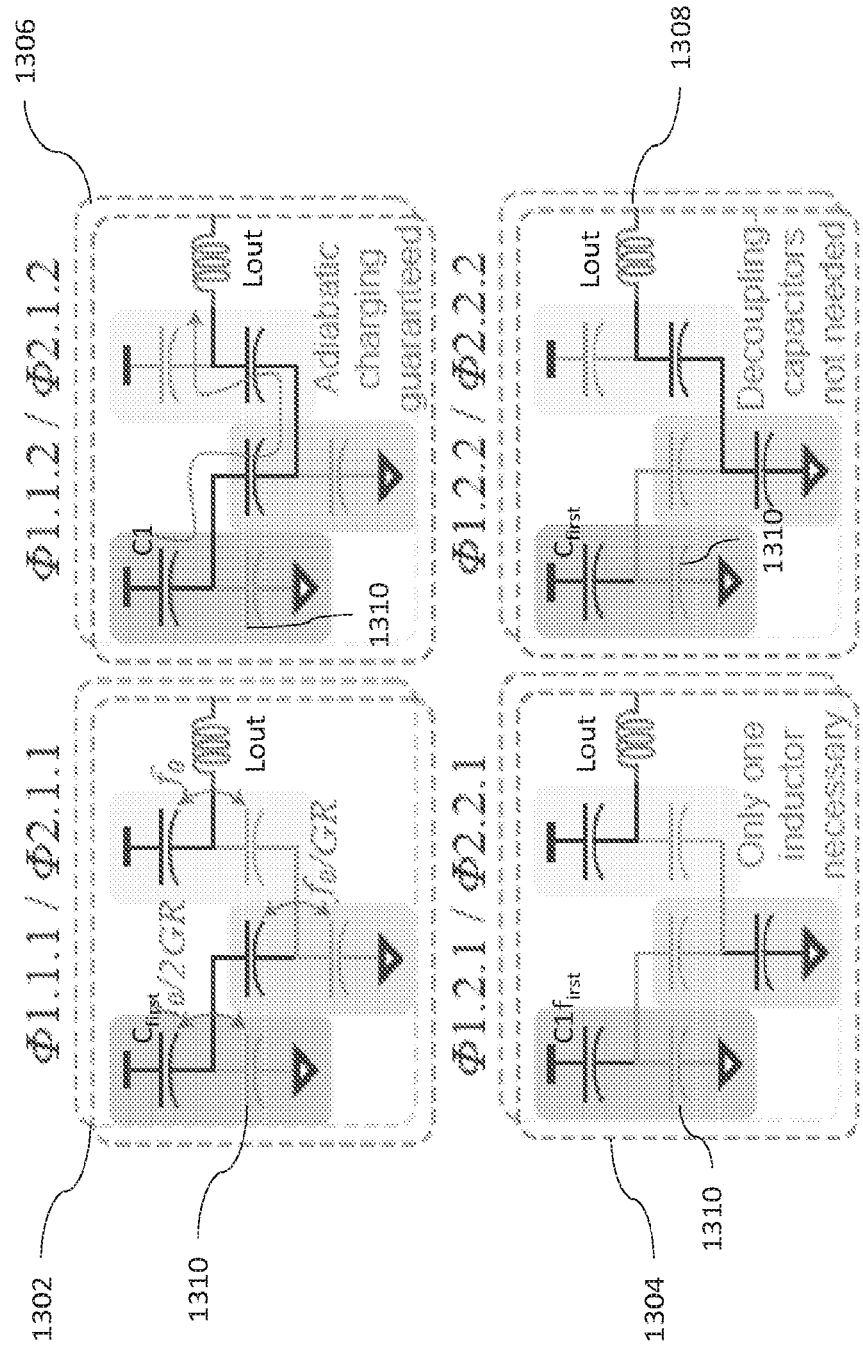
FIG. 13 illustrates switching states of the FIG. 12B converter.

FIG. 12A shows a conventional 3-bit converter, with inductors required for each of three stages C1-C3. A preferred embodiment shown in FIG. 12B is a frequency-scaled N-bit R²SC (3 bit in the example) that avoids the need for the per-stage inductor. The final stage in the binary R²SC is switched at the resonance frequency $f_0$, while the prior stages are switched at a progressively divided frequency, $f_0/GR$ and $f_0/2GR$, where GR is the Gear Ratio. GR can be any real number≥2, so that a valid steady-state output is reached. For instance, eight distinct switching states represented in sections 1302, 1304, 1306, 1308 (i.e., clock phases) result for GR=2 as illustrated in FIG. 13. Each of the represented switching states includes two states, realized by switching a first capacitor $C_{first}$ to a lower position 1310, which enable the capacitors to reach steady-state without any interstage decoupling, thereby enabling adiabatic charging of all flying capacitors through a single end stage inductor Lout.

Figure 14:
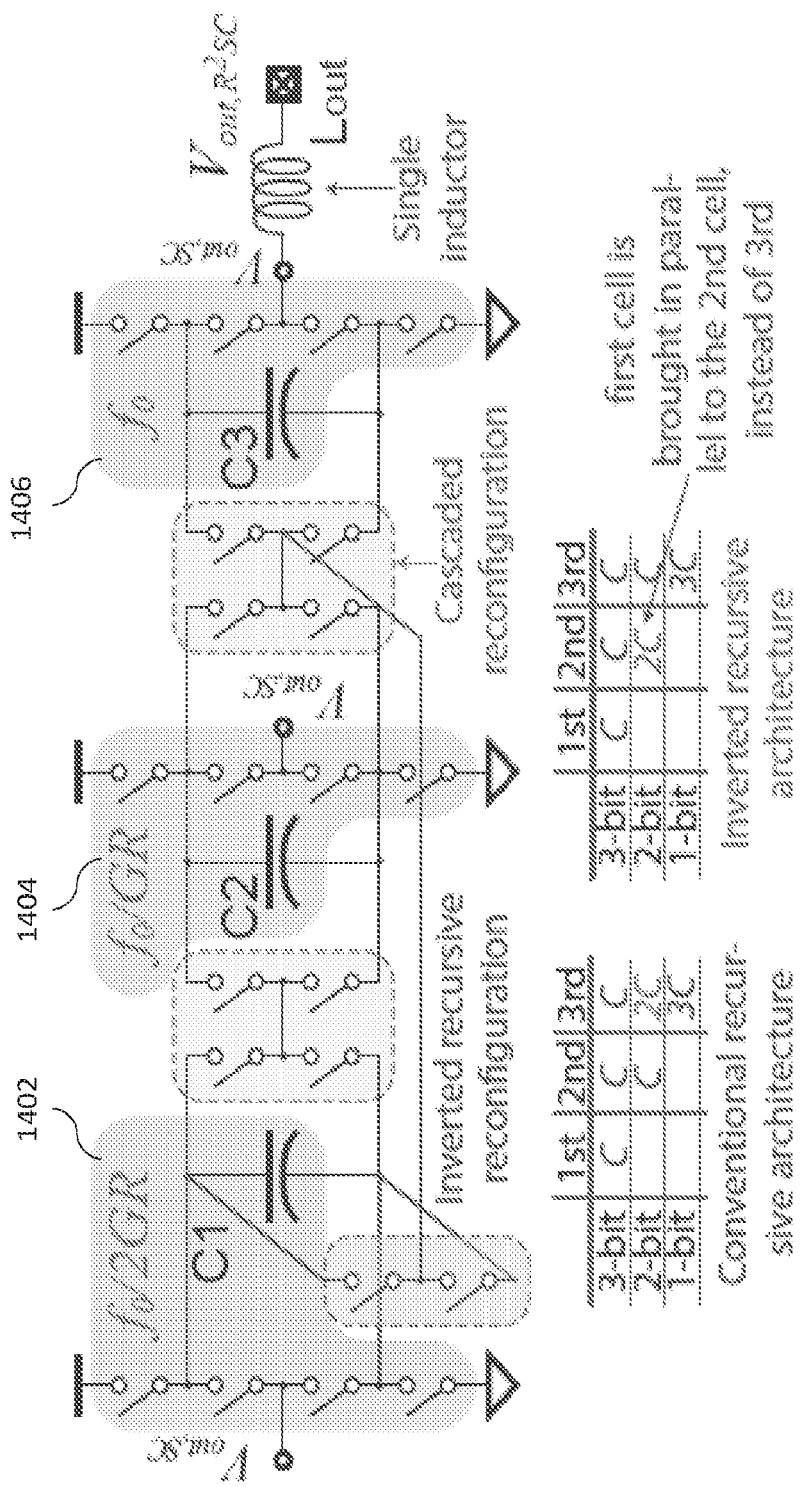
FIG. 14 illustrates a preferred recursive cell switching converter architecture.

FIG. 13 illustrates that one, two, or three capacitors are connected in series with the output inductor Lout, and hence, the resonant frequency, f0, can change from one state to the next. This is addressed by first allocating equal C (capacitance) and G (conductance) amongst the three 2:1 SC stages 1402, 1404, 1406 (corresponding to stages C1-C3 in FIG. 12B) shown in FIG. 14 to minimize resonant frequency changes. FIG. 14 also illustrates an inverted recursive architecture is provided that brings the initial cells in parallel to the latter ones when realizing lower resolution ratios. This enables the use of 50% duty-cycle clocks with <1.2% efficiency penalty without the need for complicated interstate duty-cycle shaping. In the conventional recursive architecture, the final cells are connected in parallel to the initial cells in the cascade. However, in the inverted architecture, the initial cells are brought in parallel to the final cells. So, in FIG. 14, the cell C1 is brought in parallel to C2 cell when reconfiguring from 3-bit ratio resolution to 2-bit ratio resolution.

At the 2-bit SC ratios, the inverted architecture limits the resonant frequency change amongst the switching states to <10%, instead of 70% in a conventional recursive architecture. The inverted architecture furthermore places ⅔ of the R²SC resources at the downstream stages of scaled switching parasitics. In the 3-bit case, when the 3 capacitors C1, C2, C3 (FIG. 12B) are connected in series with the output inductor, the resonance frequency is increased by 3. However, as a result of equally-sized conductance of the cascaded stages, the neper frequency a is tripled due to the tripled ESR in the resonance path, automatically compensating the damped radian frequency $\omega_d=\sqrt{\omega_0^2-\alpha^2}$ change among the consecutive switching states, as the number of capacitors in series with $L_{out}$ is changed. At the 1/2 resonant ratio, all the 3 SC cells are brought in parallel, resonating as one capacitor 3C with $L_{out}$, thanks to the output-side $L_{out}$ connection.

Fine-grain voltage regulation within each of the 7 ratios is achieved through $R_{out}$ control. However, unlike conventional $R_{out}$ modulation, the converter's damping factor is modulated to control the overall Q-factor. This is accomplished by operating the third cell ($C_3$) near $f_0$ (and its subharmonics)(Near fo=near 2*pi*fo=$\omega_d=\sqrt{\omega_0^2-\alpha^2}$) to act as a current source to the preceding N−1 bit SC cells, which are switched at a lower frequency set by the Gear Ratio as shown in a waveform 1202 of FIG. 12B, enabling efficient super-linear switching loss scaling via $R_{out,N-1}$ modulation. Increasing $R_{out,N-1}$ further reduces the Q-factor and hence gracefully damps the resonant power transfer to a purely capacitive mode, reconfiguring the resonant converter into a conventional SC. Through such modulation, the resonant peaking is gradually reduced, as evidenced by flattening of measured $R_{out}$ curves, alleviating device stresses that would otherwise occur due to the large circulating currents when modulating away from resonance with conventional $R_{out}$ frequency control.

Three modes of operation are the capacitive, subharmonic, and adiabatic modes. Beyond the resonance frequency $f_0$, $R_{out}$ drops to the same fast-switching-limit (FSL) value for all Gear Ratios, where the final stage acts as an adiabatic charger, i.e. a current source. In the capacitive region, scaling GR continuously modulates the slow-switching and fast-switching limits of $R_{out}$ while maintaining their intersection (the SC corner frequency) nearly fixed. This is equivalent to scaling the SC converter's total conductance $G_{tot}$ and capacitance $C_{tot}$, as in a digital capacitance modulation, tracking the minimum loss point, but with the ability to perform continuous loss scaling via fractional Gear Ratios.

An $R^2SC$ test chip was fabricated in a 6M 0.18 μm bulk CMOS process, and a 0.76 mm² inductor was 3D stacked on top of the die within the package. The modeled and measured $R_{out}$ of the converter exhibited graceful scaling to the exact SC $R_FSL$ at higher frequencies. Measured efficiency of the present $R^2SC$ with 18 nH and 5.5 nH inductors were compared to conventional co-fabricated SC converter and exhibited an improvement of up to 14.4%. The measured efficiency reached a peak of 72.1% with a 50%-duty clock and 73.3% with an inter-state variable-duty clock, which approaches the fundamental Wolaver limit estimated at 77% (not including the switches' drain or capacitors' bottom-plate parasitics) for the employed 0.18 μm bulk process and the 3 nF utilized capacitance.

The GR loss scaling effect was measured and showed that increasing GR from 2 to 6 improves efficiency by 5% at 3.5 mA when operating in the SC mode. Scaling GR at higher currents in resonant mode enables super-linear scaling of the switching parasitics, and thus serves to broaden the efficiency peaks for up to a 5.8% increase in efficiency. The GRM scheme operates in a manner that preserves resonant adiabatic operation at larger loads despite the frequency scaling, while tracking the optimal design point at light loads.

Compared to a single-ratio 2:1 ReSC, which operates to at most 0.83 V at 40 mA, the preferred $R^2SC$ operates to 1.4 V, achieving 3.34× larger voltage range. Due to the lower sinusoidal RMS current, the $R^2SC$ achieves a 12% improvement in efficiency compared to a co-fabricated 3-level buck operating at 50% duty cycle. The preferred frequency-scaled $R^2SC$ converter optimizes utilization of the employed energy storage components by combining the strengths of both capacitive and inductive passives, realizing a superior topology to co-fabricated SC or buck converters. When operating at light loads (e.g., 10 mA), the subharmonic resonant troughs in $R_{out}$ curves enable at least 7 additional subharmonic ratios, further flattening the efficiency profile of the converter, and enabling a total of at least 14 ratios.

Table 3 compares the experimental converter to prior art. The $R^2SC$ achieves the highest number of ratios, using only a single inductor, widest $V_{out}$ range as compared to prior resonant, 3-level buck, and SC topologies, and achieves 73.3% peak efficiency using single-well bulk CMOS without any exotic process options, and nearly reaches the Wolaver limit. The 24,000× load current dynamic range enabled by Gear Ratio Modulation exceeds state-of-the-art resonant converters by several orders of magnitude.

TABLE 3

Comparison to Prior Converters

|  | [8] | [10] | [4] | [5] | This work | | |
| --- | --- | --- | --- | --- | --- | --- | --- |
| Technology | 45 nm | 0.13 μm HV | 0.18 μm HV | 0.18 μm HV | 0.18 μm GP | | |
| Topology | SC | 3L buck | ReSC | ReSC | 3L buck | SC | $R^2SC$ |
| # of SC ratios | 1 (1/2) | — | 1 (1/2) | 1 (1/2) | — | 7 (3-bit) | 7 (3-bit) + 7 |
| # of inductors | — | 4 (4-phase) | 2 (2-phase) | 3 (3-phase) | 1 | — | 1 |
| Capacitor type | Gate oxide | N.R. | 6.6 fF/μm² triple-MIM | 6.6 fF/μm² triple-MIM | 4.0 fF/μm² dual-MIM | | |
| Total capacitance | 1.2 nF | 28 nF | 29 nF | 36.6 nF | 3 nF | | |
| Vin | 1.8 V | 2.4 V | 6 V or 3 V | 6 V or 3 V | 1.8 V | | |
| Vout | 0.8-1.0 V | 0.4-1.4 V | 3.6 or 1.8 V | 3.7 or 1.85 V | 0.75 V | 0.1-1.5 V | |
| Current density [A/mm²] | 0.05 | 0.14 | 0.16 | 0.2 | 0.08 | 0.08 | 0.14 |
| Peak efficiency | 69% | 77% | ~85.7% | 89.1% | 60.1% | 66.1% | 73.3% |
| Improvement over pure SC | — | — | N.R. (Not Reported) | N.R. | — | — | 14.4% |
| Load current dynamic range | 80X | N.R. | 24X | 5X | — | — | 24,000X |

[4] K. Kesarwani et al., "A 2-phase resonant switched-capacitor converter delivering 4.3 W at 0.6 W/mm2 with 85% efficiency," in IEEE ISSCC, February 2014, pp. 86-87.
[5] C. Schaef et al., "A variable-conversion-ratio 3-phase resonant switched capacitor converter with 85% efficiency at 0.91 W/mm2 using 1.1 nH PCB-trace inductors," in IEEE ISSCC, February 2015, pp. 1-3.
[8] Y. Ramadass et al., "A 0.16 mm2 completely on-chip switched-capacitor DC-DC converter using digital capacitance modulation for LDO replacement in 45 nm CMOS," in ISSCC, February 2010, pp. 208-209.
[10] W. Kim et al., "A fully-integrated 3-level DC/DC converter for nanosecond-scale DVS with fast shunt regulation," in IEEE ISSCC, February 2011, pp. 268-270.

3:1 Converter

Figure 15:
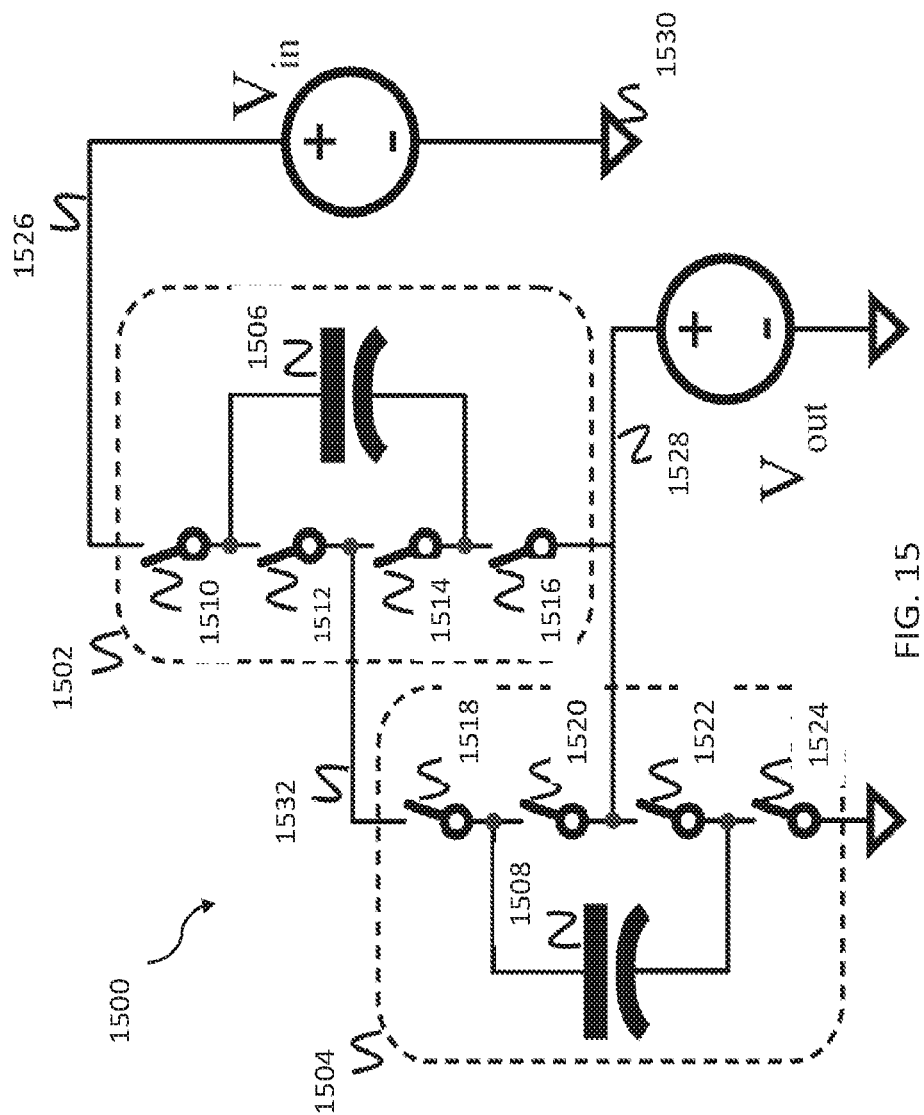
FIG. 15 illustrates a preferred embodiment 3:1 DC-DC SC converter.

As mentioned above, other ratio converters are provided by the invention. The 2:1 was an example embodiment. FIG. 15 illustrates another example switched capacitor circuit 1500 providing a 3:1 transformation (voltage conversion ratio) of an input voltage $V_{in}$ (provides output that is ⅓ of input, $V_{out}$ near $V_{in}/3$). The circuit 1500 includes two 2:1 switched capacitor cells 1502, 1504, two capacitors 1506, 1508, eight switches 1510, 1512, 1514, 1516, 1518, 1520, 1522, 1524 an input port 1526 to receive an input voltage (Vin), an output port 1528 to produce an output voltage (Vout), and a ground port 1530 to provide a common level for the input voltage Vin, and the output voltage Vout. The switches can be realized by one or more transistors. The 2:1 switched capacitor cells 1502, 1504 are connected in a stack (i.e. stacked). The output port 1532 of the first 2:1 switched capacitor cell 1502 is connected to the input port 1532 of the second switched capacitor cell 1504. The input voltage ($V_{in}$) is provided across the two stacked 2:1 switched capacitor cells 1502, 1504. The switches 1510, 1512, 1514, 1516 are connected in series. The capacitor 1506 (flying capacitor) is connected between: the input port 1526 and the cell output port 1532, or the cell output port 1532 and the cell ground port 1528, based on the operation of the switches 1510, 1512, 1514, 1516. When the switches 1510, 1514 are closed and the switches 1512, 1516 are open the capacitor 1506 is connected between the input port 1526 and the cell output port 1532 and when switches 1512, 1516 are closed and the switches 1510, 1514 are open the capacitor 1506 is connected between the cell output port 1532 and the cell ground port 1528. The pairs of switches 1510/1514, 1512/1516 are switched on and off alternatively at a constant frequency $f_{o1}$. The switches 1518, 1520, 1522, 1524 are connected in series. The switches 1518, 1520, 1522, 1524 are connected in series. The capacitor 1508 (second flying capacitor) is connected between: the cell 1502 output port 1532 and the overall converter output port 1528, or the cell 1504 output port 1528 and the ground 1530, based on the operation of the switches 1518, 1520, 1522, 1524. When the switches 1518, 1522 are closed and the switches 1520, 1524 are open the capacitor 1508 is connected between the port 1532 and the output port 1528 and when switches 1520, 1524 are closed and the switches 1518, 1522 are open the capacitor 1508 is connected between the cell output port 1528 and the cell ground port 1530. The pairs of switches 1518/1522, 1520/1524 are switched on and off alternatively at a constant frequency $f_{o2}$. In one embodiment, the switching frequency of the second cell 1504 ($f_{o2}$) is twice the switching frequency of the first cell 1502 ($f_{o1}$), so that the overall converter output voltage ($V_{out}$) reaches a valid steady-state value near (Vin/3) without requiring any decoupling capacitance at the port 1532. In another embodiment, the switching frequency of the first cell 1502 ($f_{o1}$) is twice the switching frequency of the second cell 1504 ($f_{o2}$), so that the overall converter output voltage (Vout) reaches a valid steady-state value near ($V_{in}/3$) without requiring any decoupling capacitance at the port 1532. In another embodiment, the switching frequency of the second cell 1504 ($f_{o2}$) is larger than the switching frequency of the first cell 1502 ($f_{o1}$), so that the overall converter output voltage ($V_{out}$) reaches a valid steady-state value near ($V_{in}/3$) without requiring any decoupling capacitance at the port 1532

The circuit 1500 can be converted from a 3:1 voltage conversion ratio to a 3:2 voltage conversion ratio by reconfiguring the placement of the load (where $V_{out}$ is provided from). While not illustrated, the load may be switched from being connected to the output port of the cell 1504 to being connected to the output port of the cell 1502 by utilizing a switching mechanism and thus a 3:2 voltage conversion ratio is available.

Figure 16:
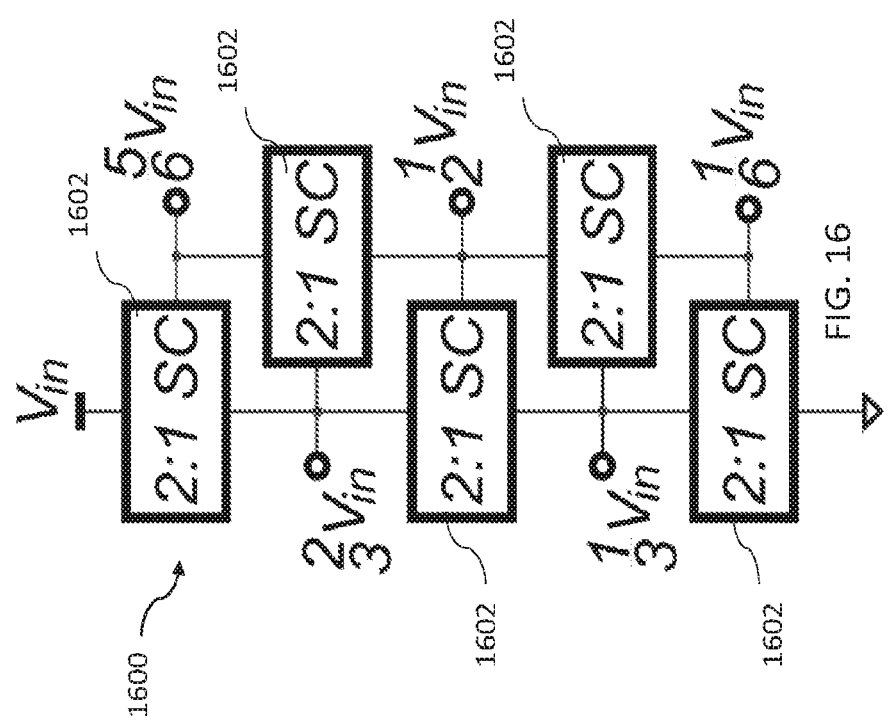
FIG. 16 illustrates an example switched capacitor circuit that may be utilized to provide several voltage conversion ratios of an input voltage.

FIG. 16 illustrates an example switched capacitor circuit 1600 that may be utilized to provide several voltage conversion ratios of an input voltage ($V_{in}$) by stacking a plurality of 2:1 switched capacitor circuits 1602. The placement of load may be reconfigured to select an appropriate voltage conversion ratio.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A DC-DC converter, comprising:
a plurality of capacitive converter cells that provide a plurality of conversion ratios; and
an all-digital binary search controller that dynamically switches through a plurality of modes using an outer coarse-grain controller search at a clock rate of the converter; and
fine grain control logic to search at a multiple of the clock rate of the converter and set a final conversion ratio using output of the converter as a voltage reference.

2. The converter of claim 1, wherein the multiple of the clock rate is generated by an oscillator that is on-chip with the all-digital binary search controller.

3. The converter of claim 1, further comprising a recursive ratio decoder that responds to the binary search controller and sets switches in the plurality of converter cells to a conversion ratio set by the binary search controller.

4. The converter of claim 3, wherein the plurality of converter cells comprise 2:1 switching capacitive converters arranged as boundary cells and transfer cells.

5. The converter of claim 3, wherein the fine grain control includes a comparator that compares a present stage power output to desired voltage level and the recursive ratio decoder configures into a larger binary ratio if the comparator determines that the present power stage has a lower than desired voltage and configures into a next lower resolution if the comparator determines that the power stage exceeds the desired voltage.

6. The converter of claim 1, in one of a laptop computer, tablet or smart phone.

7. The converter of claim 1, wherein the all-digital binary search controller and the fine grain control logic set switches to obtain a sequential circuit comprising an interconnected arrangement the plurality of capacitive converter cells to execute a control law.

8. A method of performing voltage regulation of a DC-DC conversion from an input voltage to a desired output voltage by selectively configuring a plurality of converter cells using a controller having a comparator and a sequential logic, the method comprising: obtaining a target voltage ratio based on the input voltage and the desired output voltage with coarse control that selects a configuration of the plurality of converter cells, and refining the target voltage ratio within a predefined plurality converter conversion ratios by comparing voltage output to the desired output voltage at a higher rate of comparison than the coarse control and selecting a refined configuration of the plurality of converter cells.

* * * * *